(12) United States Patent
Jacot

(10) Patent No.: US 12,349,801 B2
(45) Date of Patent: Jul. 8, 2025

(54) STOWABLE BED

(71) Applicant: JD JACOT CORP, Kingston, WA (US)

(72) Inventor: Douglas S Jacot, Kingston, WA (US)

(73) Assignee: JD JACOT CORP, Kingston, WA (US)

( * ) Notice: Subject to any disclaimer, the term of this patent is extended or adjusted under 35 U.S.C. 154(b) by 301 days.

(21) Appl. No.: 17/984,136

(22) Filed: Nov. 9, 2022

(65) Prior Publication Data

US 2023/0172366 A1 Jun. 8, 2023

Related U.S. Application Data

(63) Continuation-in-part of application No. 16/836,856, filed on Mar. 31, 2020, now Pat. No. 11,896,138.
(Continued)

(51) Int. Cl.
*A47C 27/08* (2006.01)
*A47C 27/00* (2006.01)
(Continued)

(52) U.S. Cl.
CPC .......... *A47C 27/084* (2013.01); *A47C 27/007* (2013.01); *A47C 27/088* (2013.01);
(Continued)

(58) Field of Classification Search
CPC ... A47C 27/084; A47C 27/002; A47C 27/088; A47C 27/10; A47C 31/001; A47C 31/105; A47C 27/081; A47C 17/70; A47C 27/18; A47C 27/007; A47C 27/082; A47C 27/148; A47C 27/144; A47C 17/64; A47C 4/54; A47C 7/021; A47C 27/085; A47C 27/15;
(Continued)

(56) References Cited

U.S. PATENT DOCUMENTS

| | | | |
|---|---|---|---|
| 2,068,134 | A | 1/1937 | Houghton |
| 2,326,441 | A | 8/1943 | Cunningham |

(Continued)

FOREIGN PATENT DOCUMENTS

| | | |
|---|---|---|
| CH | 428124 | 1/1967 |
| CN | 2554967 Y | 6/2003 |

(Continued)

OTHER PUBLICATIONS

CN1551738A (Dec. 1, 2004)—EPO Espacenet Bib Data, Description, Claims, Abstract (Machine Translation—English)—10pgs.
(Continued)

*Primary Examiner* — Madison Emanski
(74) *Attorney, Agent, or Firm* — R. Reams Goodloe, Jr.

(57) ABSTRACT

A self-inflating stowable bed. The bed includes one or more self-inflating chambers, with each of the self-inflating chambers having one or more polyurethane foam sections therein, with the chamber defined between a first air impervious layer and a second air impervious layer. The self-inflating bed may be evacuated by a household or shop vacuum, and then sealed, rolled or folded, and easily stored or shipped. The polyurethane foam sections may be provided with different members having different indentation force deflection specifications suitable for bed portions and edge of bed portions.

20 Claims, 26 Drawing Sheets

Related U.S. Application Data

(60) Provisional application No. 62/832,019, filed on Apr. 10, 2019.

(51) Int. Cl.
| | | |
|---|---|---|
| *B32B 3/02* | (2006.01) | |
| *B32B 3/08* | (2006.01) | |
| *B32B 3/30* | (2006.01) | |
| *B32B 5/02* | (2006.01) | |
| *B32B 5/18* | (2006.01) | |
| *B32B 7/12* | (2006.01) | |
| *B32B 27/06* | (2006.01) | |
| *B32B 27/12* | (2006.01) | |
| *B32B 27/30* | (2006.01) | |
| *B32B 27/40* | (2006.01) | |

(52) U.S. Cl.
CPC ............... *B32B 3/02* (2013.01); *B32B 3/08* (2013.01); *B32B 3/30* (2013.01); *B32B 5/022* (2013.01); *B32B 5/024* (2013.01); *B32B 5/026* (2013.01); *B32B 5/18* (2013.01); *B32B 7/12* (2013.01); *B32B 27/065* (2013.01); *B32B 27/12* (2013.01); *B32B 27/304* (2013.01); *B32B 27/40* (2013.01); *B32B 2250/40* (2013.01); *B32B 2266/0278* (2013.01); *B32B 2266/06* (2013.01); *B32B 2307/7242* (2013.01); *B32B 2307/732* (2013.01)

(58) Field of Classification Search
CPC ..... A47C 27/087; A47C 27/001; A47C 27/20; A47C 27/146; A47C 21/046; B32B 5/02; B32B 5/18; B32B 7/12; B32B 27/065; B32B 27/12; B32B 2266/0278; B32B 2266/06; B32B 2307/3065; B32B 2479/00; B32B 2250/03; B32B 5/022; B32B 27/08; B32B 27/304; B32B 2250/05; B32B 2307/51; B32B 2307/732; B32B 5/026; B32B 2250/40; B32B 2262/0215; B32B 2307/7242; B32B 5/024; B32B 5/245; B32B 5/26; B32B 3/30; B32B 2307/56; B32B 2307/7376; B32B 2601/00; F16K 15/20
USPC ........ 5/655.3, 706, 709, 420, 654, 710, 713, 5/700, 722, 731, 738, 932
See application file for complete search history.

(56) References Cited

U.S. PATENT DOCUMENTS

| | | |
|---|---|---|
| 2,372,218 A | 3/1945 | Manson et al. |
| 2,604,641 A | 7/1952 | Reed |
| 2,691,179 A | 10/1954 | Kann |
| 3,533,113 A | 10/1970 | Stamberger |
| 3,766,579 A | 10/1973 | Shields |
| 4,025,974 A | 5/1977 | Lea et al. |
| 4,091,482 A | 5/1978 | Malcolm |
| 4,149,919 A | 4/1979 | Lea et al. |
| 4,261,776 A | 4/1981 | Lea |
| 4,723,329 A | 2/1988 | Vaccaro |
| 4,766,628 A | 8/1988 | Walker |
| 4,803,744 A | 2/1989 | Peck et al. |
| 4,977,633 A | 12/1990 | Chaffee |
| 5,033,133 A | 7/1991 | Nissen |
| 5,152,018 A | 10/1992 | Lea |
| 5,282,286 A | 2/1994 | MacLeish |
| 5,507,318 A | 4/1996 | Israelson |
| 5,552,205 A | 9/1996 | Lea |
| 5,598,593 A | 2/1997 | Wolfe |
| 5,632,055 A | 5/1997 | Graf |
| 5,642,546 A | 7/1997 | Shoenhair |
| 5,765,246 A | 6/1998 | Shoenhair |
| 5,926,874 A | 7/1999 | Browder |
| 5,974,608 A | 11/1999 | Haller et al. |
| 6,076,214 A | 6/2000 | Klimenko |
| 6,108,835 A | 8/2000 | Hwang |
| 6,446,289 B1 * | 9/2002 | Su .................... A47C 27/18 5/709 |
| 6,611,981 B1 | 9/2003 | Lin |
| 6,665,893 B2 | 12/2003 | Fruge |
| 6,671,910 B2 | 1/2004 | Hsu et al. |
| 6,754,925 B1 | 6/2004 | Wang |
| 6,836,914 B1 | 1/2005 | Tsai |
| 7,107,641 B2 | 9/2006 | Davis |
| 7,134,158 B2 | 11/2006 | Tokarz |
| 7,147,106 B2 | 12/2006 | Kowalski et al. |
| 7,353,555 B2 | 4/2008 | Lau |
| 7,412,738 B2 | 8/2008 | Chaffee |
| 7,631,381 B2 | 12/2009 | Flippin |
| 8,584,287 B2 | 11/2013 | Hrubant et al. |
| 8,955,182 B1 | 2/2015 | Schiller et al. |
| 9,913,548 B2 | 3/2018 | Jacot et al. |
| 10,092,242 B2 | 10/2018 | Nunn et al. |
| 2002/0116766 A1 * | 8/2002 | Stolpmann .......... A47C 27/18 5/713 |
| 2002/0138911 A1 | 10/2002 | Giori et al. |
| 2002/0148045 A1 | 10/2002 | Giori et al. |
| 2003/0200611 A1 | 10/2003 | Chaffee |
| 2003/0217414 A1 * | 11/2003 | Marson ............... B32B 5/32 5/709 |
| 2005/0005363 A1 | 1/2005 | Glori et al. |
| 2005/0044634 A1 | 3/2005 | Wang |
| 2005/0193494 A1 | 9/2005 | Lau |
| 2006/0037145 A1 | 2/2006 | Wang |
| 2006/0075569 A1 | 4/2006 | Giori et al. |
| 2006/0174416 A1 | 8/2006 | Wu |
| 2006/0174417 A1 | 8/2006 | Elrod et al. |
| 2009/0130373 A1 | 5/2009 | Sharir |
| 2009/0139034 A1 | 6/2009 | Maarbjerg |
| 2011/0072589 A1 | 3/2011 | Dennis et al. |
| 2011/0154574 A1 | 6/2011 | Hrubant et al. |
| 2012/0011656 A1 | 1/2012 | Daly |
| 2013/0025070 A1 | 1/2013 | Ruehlmann |
| 2014/0209184 A1 | 7/2014 | Frayne |
| 2014/0298589 A1 | 10/2014 | Bailey |
| 2016/0186874 A1 | 6/2016 | Lin |
| 2016/0223095 A1 | 8/2016 | Sando et al. |
| 2017/0042338 A1 | 2/2017 | Yang |
| 2017/0367489 A1 | 12/2017 | Marson et al. |
| 2018/0017177 A1 | 1/2018 | Marson et al. |

FOREIGN PATENT DOCUMENTS

| | | |
|---|---|---|
| CN | 2593659 Y | 12/2003 |
| CN | 1551738 A | 12/2004 |
| CN | 108569377 A | 9/2018 |
| CN | 211092927 U | 7/2020 |
| CN | 111795196 A | 10/2020 |
| EP | 0255301 A1 | 2/1988 |
| EP | 0839480 B1 | 5/2003 |
| EP | 1523912 A1 | 4/2005 |
| EP | 1082039 B1 | 1/2006 |
| EP | 2030533 A2 | 3/2009 |
| GB | 305911 | 2/1929 |
| GB | 2185681 A | 7/1987 |
| KR | 100789361 B1 | 1/2008 |
| WO | WO 1986/02244 A1 | 4/1986 |
| WO | WO0065962 | 11/2000 |
| WO | WO 2004/006726 A1 | 1/2004 |
| WO | WO 2014/130538 A1 | 8/2014 |
| WO | WO 2016/018768 A1 | 2/2016 |
| WO | WO 2016/141240 A1 | 9/2016 |
| WO | WO 2016/141436 A1 | 9/2016 |
| WO | WO 2018/064776 A1 | 4/2018 |
| WO | WO 2018/156971 A1 | 8/2018 |

OTHER PUBLICATIONS

CN211092927U (Jul. 28, 2020) (ZL201920991435.5—Jun. 27,

(56) References Cited

OTHER PUBLICATIONS

2019)—EPO Espacenet Bib Data, Description, Claims, Abstract (English)—10pgs.
PCT International Search Report and Written Opinion (dated Oct. 28, 2015) PCT/US15/042121, Cascade Designs, Inc. (7 pages).
PCT International Search Report and Written Opinion (dated May 23, 2016) PCT/US16/020775, Cascade Designs, Inc. (8 pages).
PCT International Search Report (ISA-KIPO)—Jul. 13, 2020 (4 pages).
PCT Written Opinion of the International Searching Authority (ISA-KIPO)—Jul. 13, 2020 (10 pages).
https://www.furniture.com/mattress/guide/glossary/foam Meaning of the Term as it Pertains to Mattresses (1pg).
European Patent Office, Supplementary Partial European Search Report, EP20787020, Applicant—JD Jacot Corp—(Apr. 17, 2023) with Communication cover sheet (9 pages).
PCT International Search Report; Written Opinion of the ISA (KIPO) May 17, 2023. PCT/US2023/011344, Applicant—JD Jacot Corp—International Filing Date: Jan. 23, 2023.
CN111795196A—Espacenet English translation, Bib Data, Description and Claims (8 pages).
CN2554967 A—Espacenet English translation, Bib Data, Description and Claims (8 pages).
KR10-0789361 B1 (Jan. 2, 2008)—EPO Espacenet Bib Data/Abstract (English)—Mat For Emergency Prevention, Applicants: Fabinno Co Ltd. Inventor: Chang Dong Ho (1 page) with EPO English translation of description and claims (9 pages).

\* cited by examiner

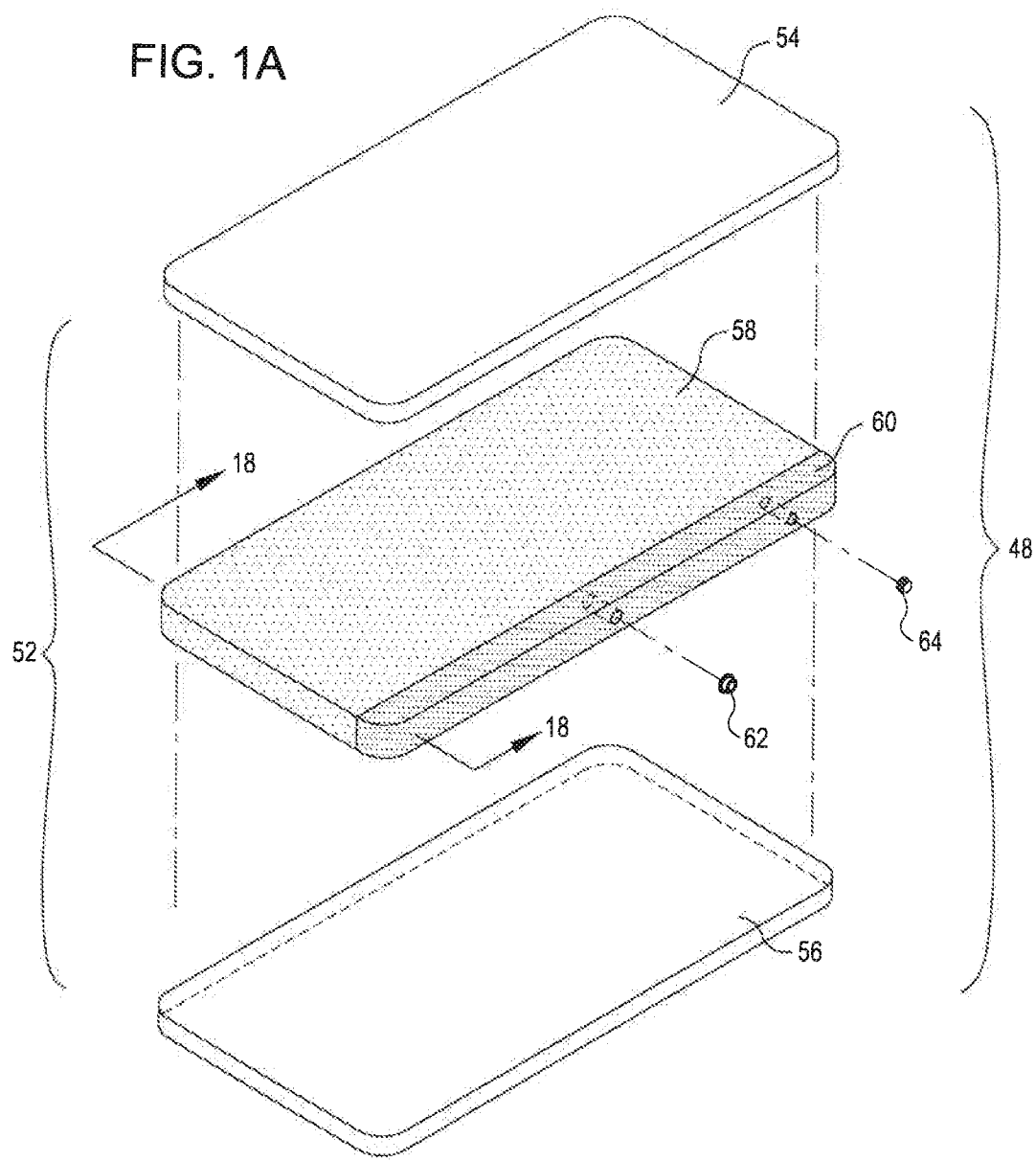

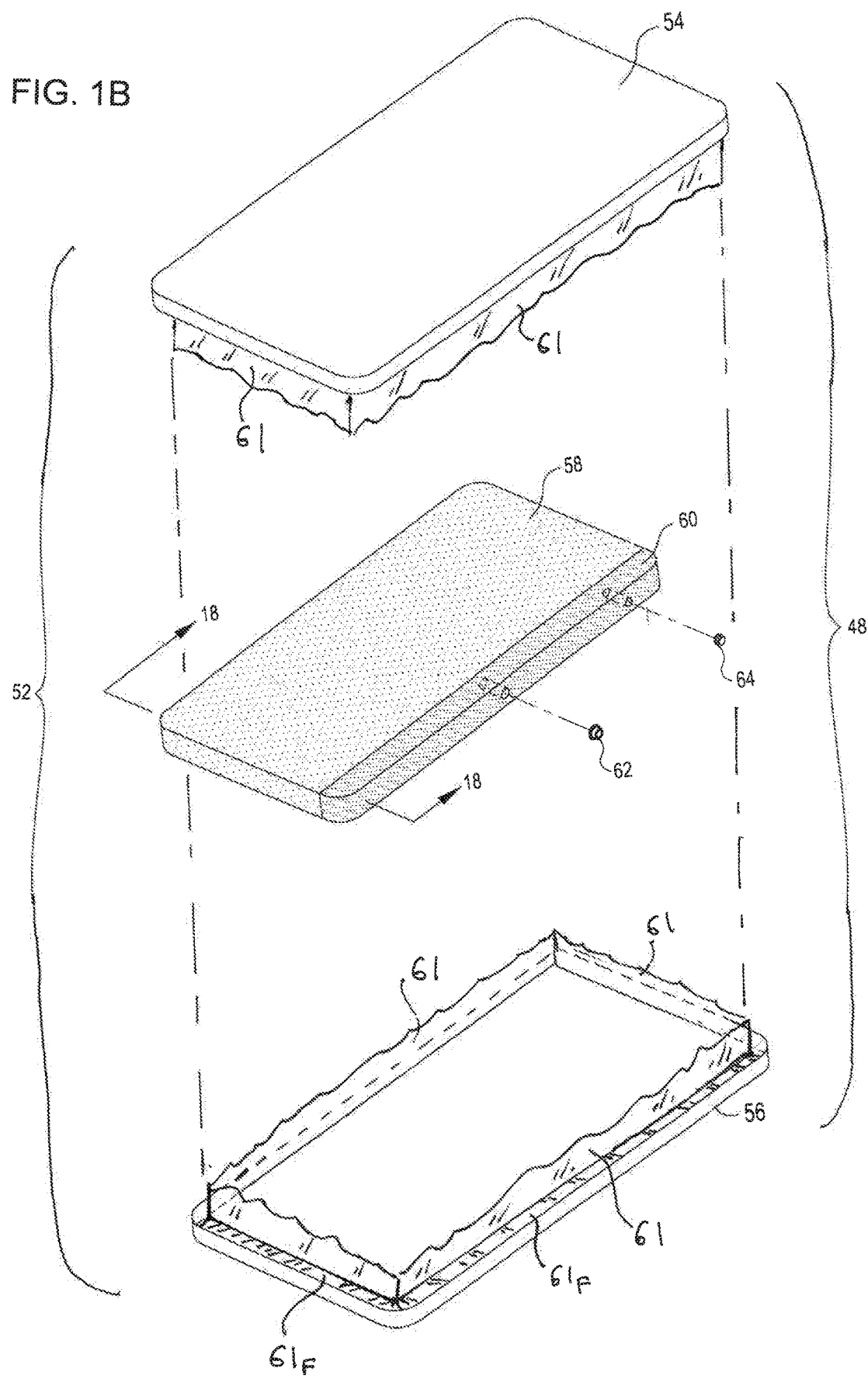

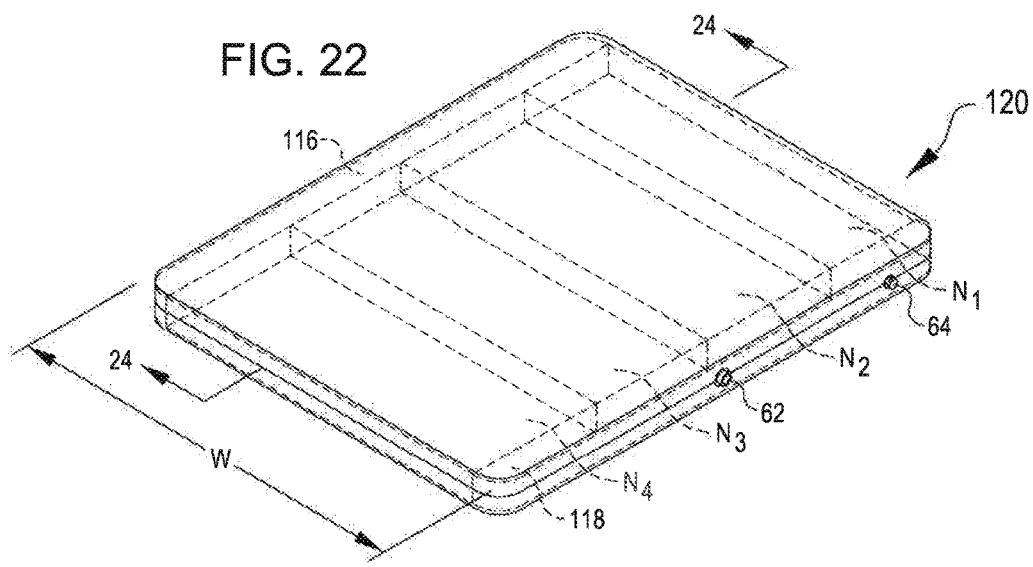
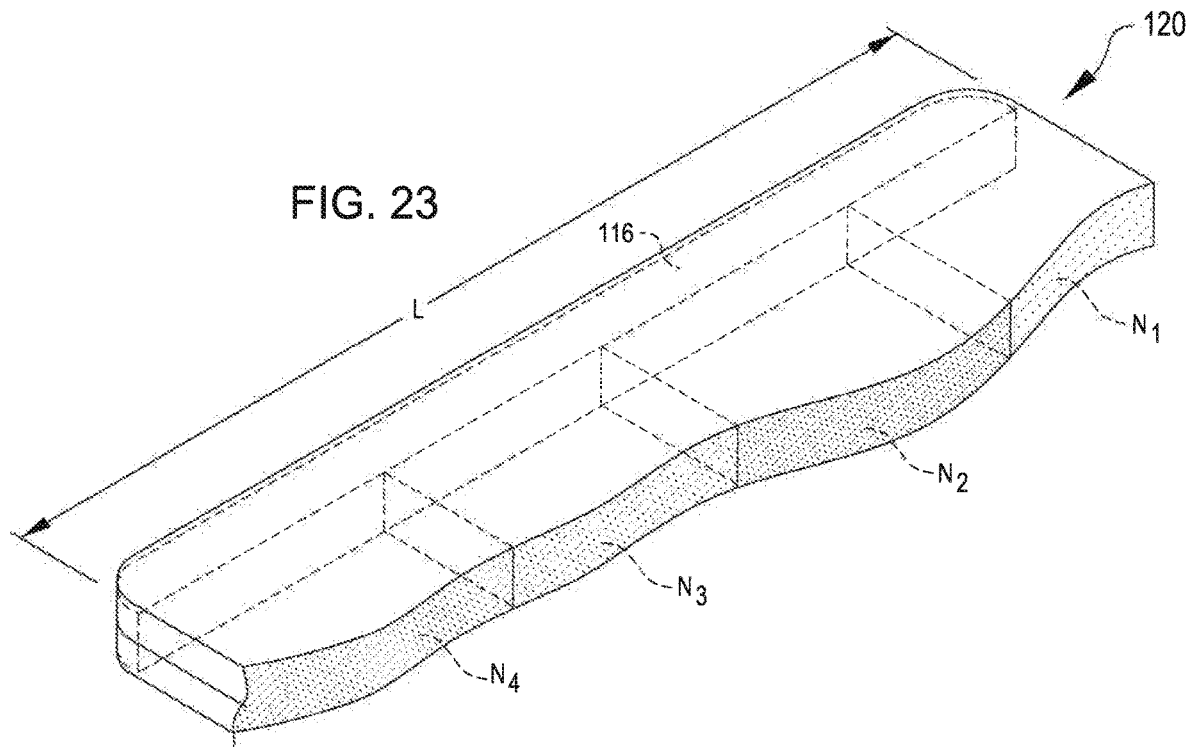

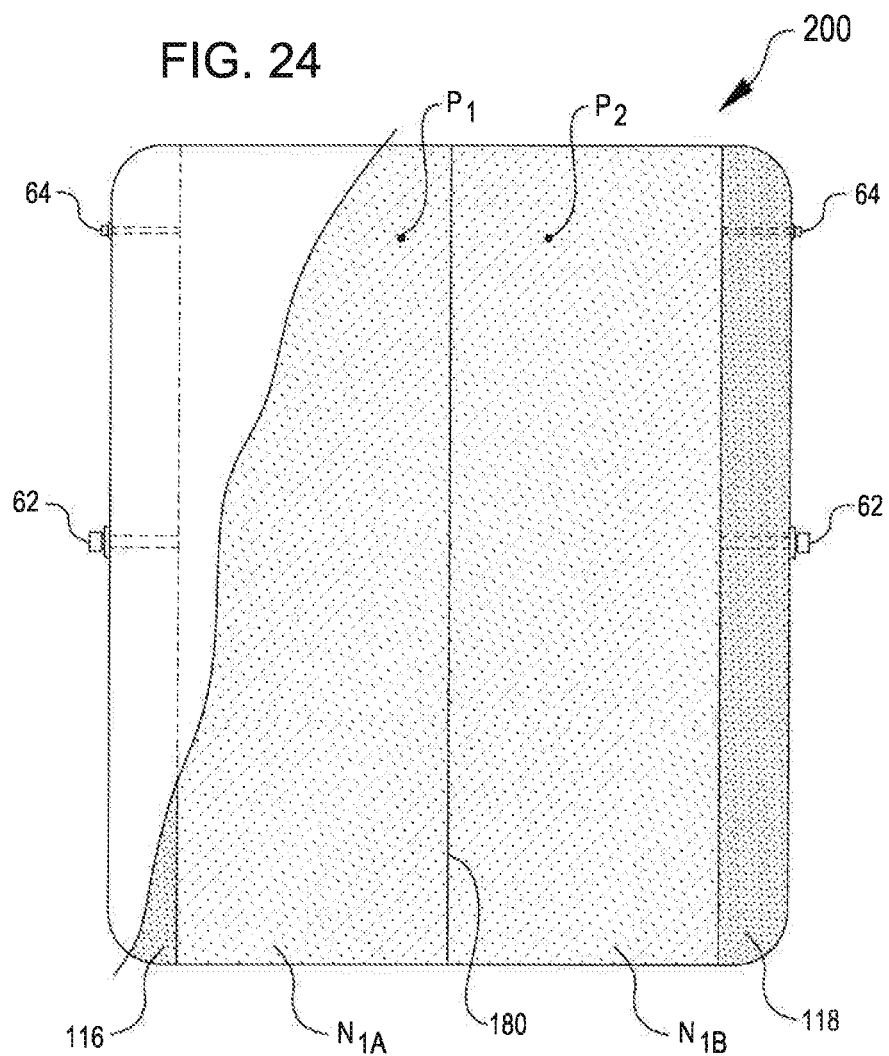

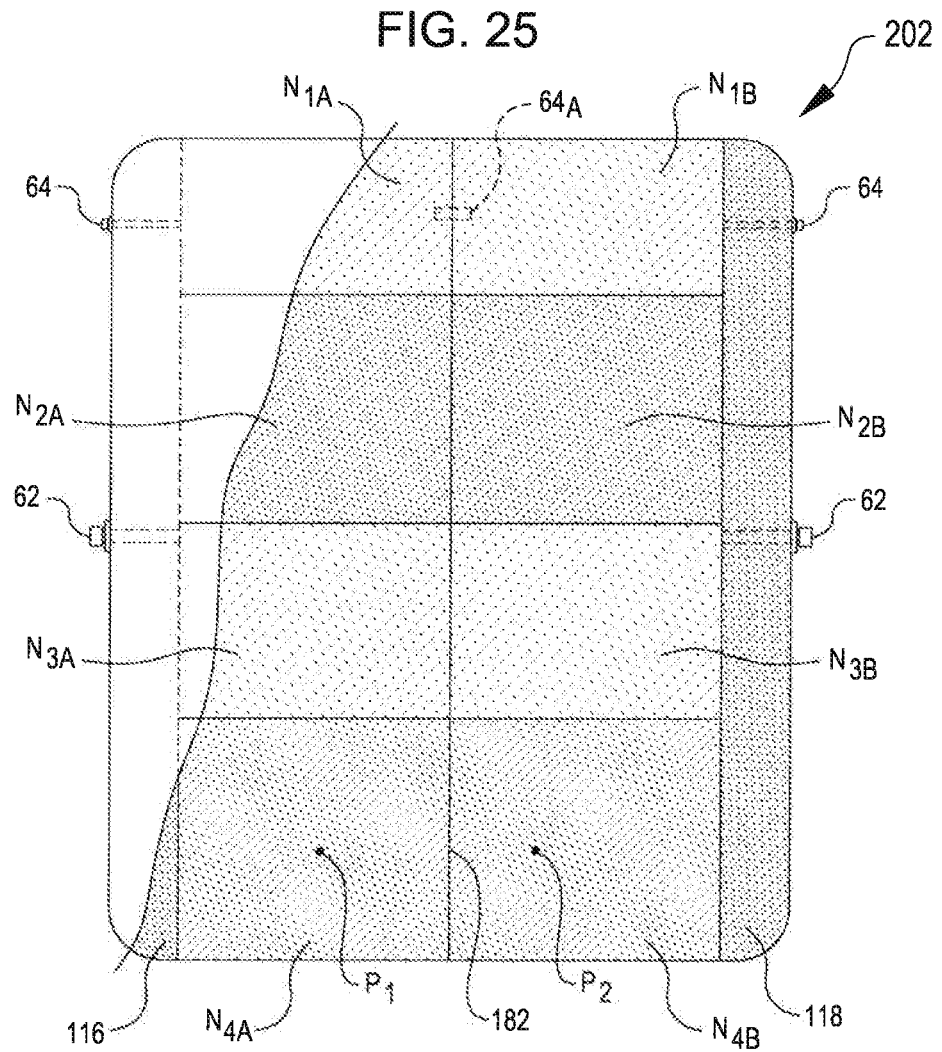

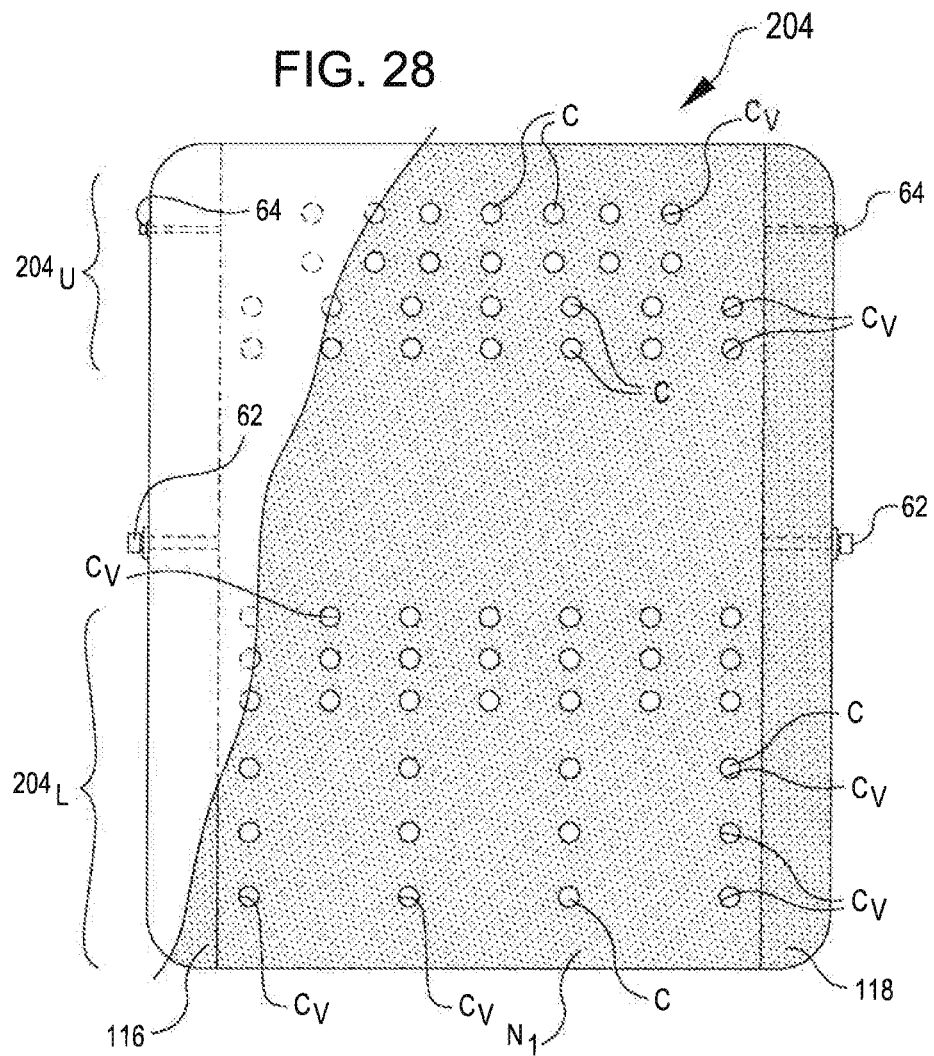

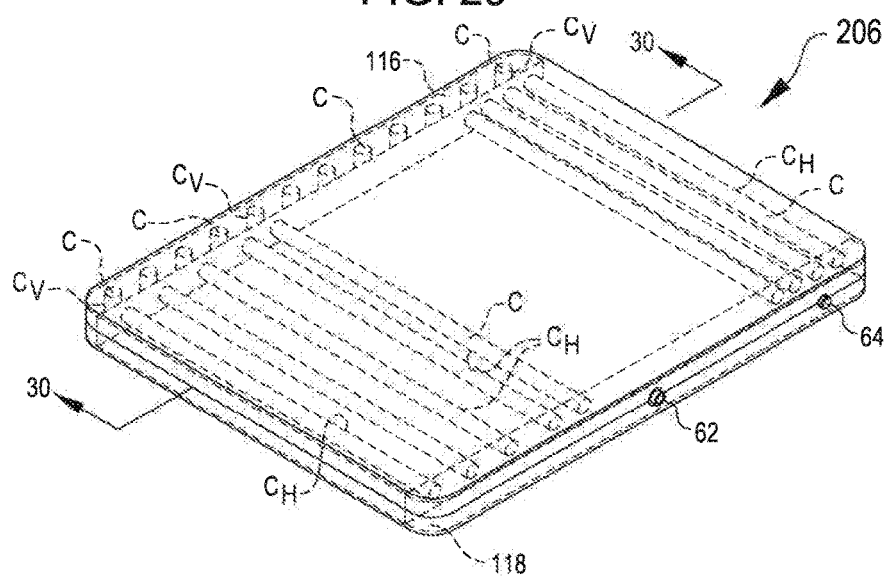
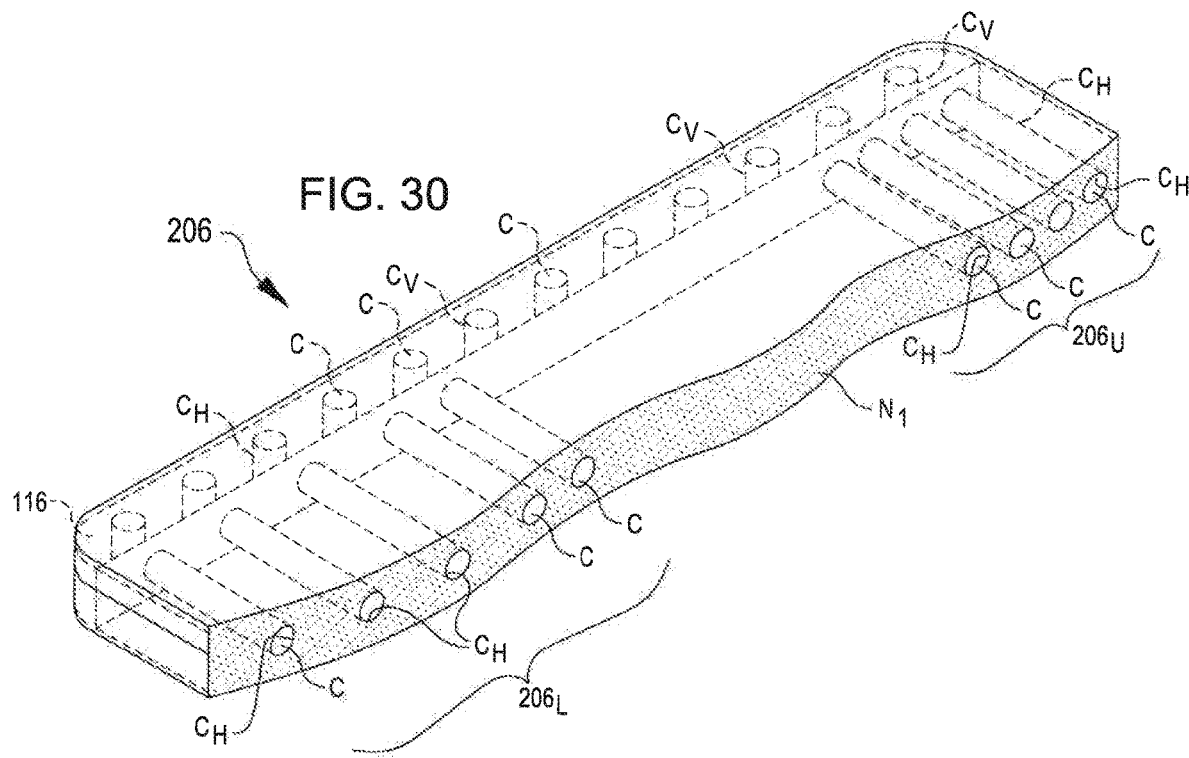

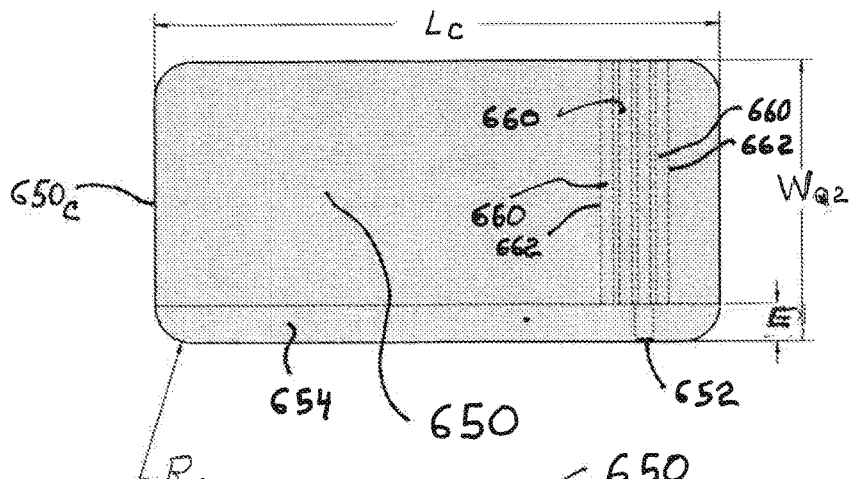
FIG. 39
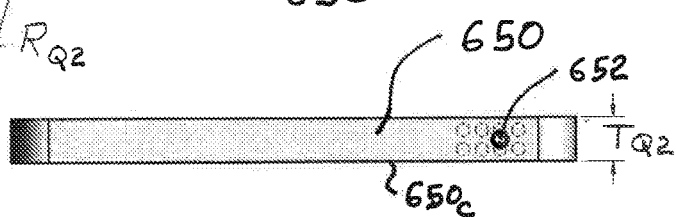
FIG. 40
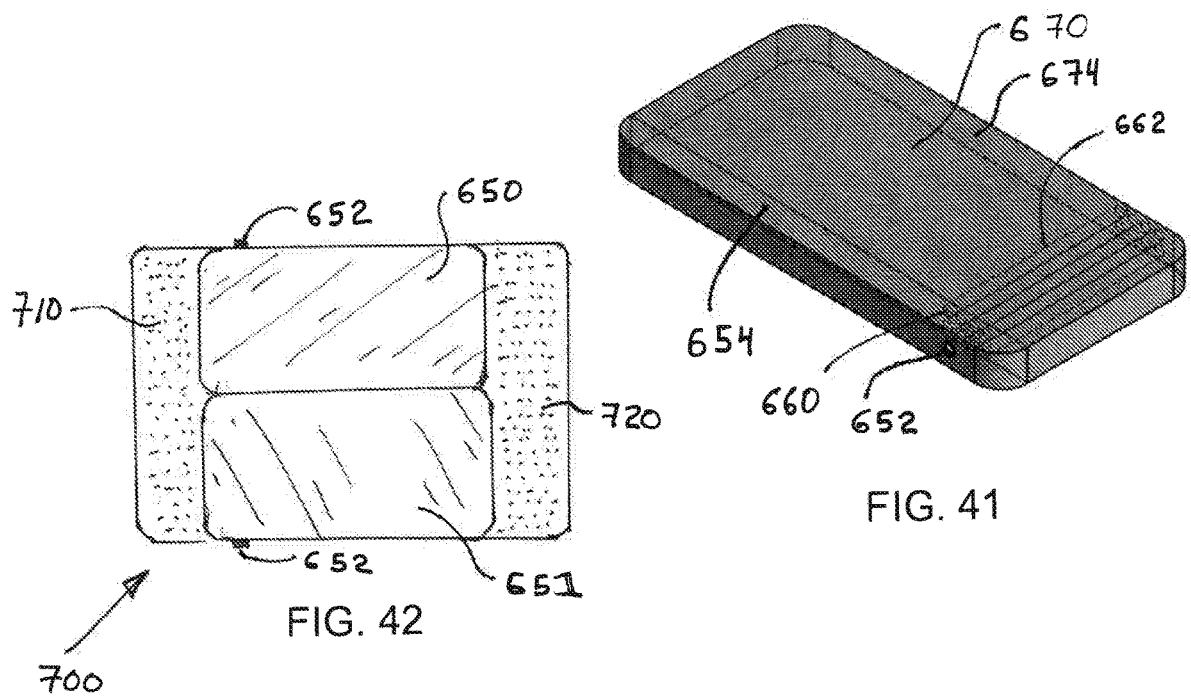
FIG. 41
FIG. 42

STOWABLE BED

RELATED PATENT APPLICATIONS

This application is a continuation-in-part and claims priority under 35 USC § 120 of prior and now pending U.S. patent application Ser. No. 16/836,856 filed Mar. 31, 2020, which application claimed priority under 35 USC. § 119 (e) from U.S. Provisional Patent Application Ser. No. 62/832,019, filed Apr. 10, 2019, entitled STOWABLE BED, the disclosures of each are incorporated herein in their entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to self-inflating beds, and more specifically, to self-inflating beds which include a vacuum valve for connection to a vacuum source for removal of air from the self-inflating bed when in an inflated condition.

BACKGROUND

A continuing interest and need exists for improvements in self-inflating beds, and more particularly for designs that would provide a significant improvement in minimization of storage space when not in use. The home bedding retail market has been undergoing significant change, with the recent adoption of the "bed-in-box" model for distribution of beds to today's internet savvy consumers. Although the "bed-in-box" is a relatively new distribution model, there are still many shortcomings in current self-inflating bed offerings which are provided by current distribution channels. For example, it is unwieldy, and likely impossible for most consumers, to take many basic bed designs, once used, and then compress it into a "UPS shippable" box. Many current beds will never fit back into shipping boxes, once removed (unless the user also has access to a large compression machine).

Thus, it would be desirable if a self-inflating bed was available configured in a manner that eliminates many of the shortcomings of various bed-in-box type mattresses on the market today. For example, convenient repackaging to a compact, UPS shippable box size configuration, would facilitate warranty returns, storage after use, and moving of the bed. And, improved valving features which facilitate comfort adjustments would be advantageous.

Consequently, a technical problem remains, namely the need to provide an improved design for a stowable self-inflating bed that can be easily repackaged for storage and shipment. Moreover, it would be advantageous if such a design simultaneously resolves various practical problems, including (a) minimized volume for storage of the bed upon evacuation of air from the bed, (b) improved valving for comfort control, and (c) meeting applicable governmental requirements for fire safety of various components of the bed, including ticking.

Additionally, while there have been many attempts by others in providing a stowable bed, most versions of which I am aware have fallen flat when it came to consumer acceptance. While there have been exceptions, such as the inexpensive Intex® Airbed, its success has mainly been predicated on how cheaply they can be purchased. At best, currently available stowable beds are only a temporary or an emergency bed solution. Existing designs known to me perform poorly when it comes to comfort, warmth, stability, adjustability and durability. Consequently, there remains a need for an improved stowable bed which provides stability, adjustability, comfort, and warmth to the user.

Some Objects, Advantages, and Novel Features

Accordingly, one objective of my invention is to provide a design for a stowable bed which is simple, straightforward, and which in a compressed, deflated condition, is sized, shaped, and weight limited in a manner suitable for shipment via United Parcel Service ("UPS"), or similar package shipment and delivery providers.

Another objective of my invention is to provide a design for a stowable bed which may be easily adjusted to provide a desired level of comfort, whether in a single bed or in a larger bed such as a queen sized configuration.

Another important objective is to provide a stowable bed which meets applicable governmental flammability standards for ticking.

A related and important objective is to provide a stowable bed design which includes multiple inflatable portions, so that a desired comfortable level can be easily controlled.

Another important objective is to provide firm edge portions that enable a user to easily exit the bed.

Finally, another important objective is to provide a high quality stowable bed design which includes multiple foam sections with varying degrees of indentation force deflection, so that the comfort of a user is maximized.

SUMMARY

A stowable, self-inflating bed design is provided. A core assembly of the bed includes one or more air impervious enclosures which form plenums filled with and bonded to a breathable resilient foam-like material. The core assembly of the bed is covered by a traditional bed ticking which provides the consumer with the expected look and feel of a traditional bed. The air impervious plenum(s) are controlled by at least two different types of purposeful functioning air control valves. The traditional bed ticking is designed to provide access to the air control valves, without compromising the look and feel of a traditional bed. The air control valves include (a) a vacuum port valve, and (b) a comfort adjustment valve. The vacuum port is configured to mate with a traditional household vacuum or shop vacuum (with simple adapters, if necessary) that allow the consumer to deflate the bed down to a flattened, squeezed together structure which is a fraction of its normal operational thickness and volume. Benefits provided by this feature include the ability to easily shrink the stowable bed for storage, for transport to another location for use, or for the consumer to return the bed to the manufacture for warranty claims or other reasons. When ready to redeploy the bed, the consumer can just re-open the vacuum port valve and allow the resilient foam-like material to inhale air through the vacuum port. Once reinflated, the consumer closes the vacuum port valve and the bed is again ready to use. Being pumpless, this configuration allows for use off-grid or in rooms without electrical connections.

The comfort adjustment valve provides the consumer with the added benefit of being able to adjust the firmness of the bed. Additionally, including a comfort adjustment valve in a bed with provides two or more separate air impervious plenums give two users the ability to separately adjust the pressure and firmness of their side of a bed, independently from adjustments made by their partner on the other side of the bed.

In an embodiment, no electrical connections or Wi-Fi are necessary to operate the comfort adjustment valve. However, the comfort adjustment valve can be designed with various features including a fully automated version which the user would not have to adjust manually. Additionally, the use of multiple comfort adjustment valves, lengthwise along the bed, allows a multi-chamber approach, where separate air impervious plenums are provided along appropriate lengths from top to bottom of the bed, which, for example allows further firmness adjustability along one's torso.

In various embodiments, a self-inflating bed may be provided which utilizes one or more self-inflating chambers. In various embodiments, two or more self-inflating chambers may be provided. Each of the self-inflating chambers are defined between a first air impervious layer and a second air impervious layer. In an embodiment, the first air impervious layer and the second air impervious layer may each be provided by an elastic thermoplastic material having an internal side and an external side, and a thickness T of between about one (1) mil (0.001 inches) and about twelve (12) mils (0.012 inches). In an embodiment, the first air impervious layer and the second air impervious layer may each be provided by an elastic thermoplastic material having an internal side and an external side, and a thickness T of between a thickness T of between about two (2) mils (0.002 inches) and about five (5) mils (0.005 inches). A first bonding layer is adhered to the internal side of the first air impervious layer, and a second bonding layer is adhered to the internal side of said second air impervious layer. In an embodiment, each of the first bonding layers and second bonding layers incudes an extruded bonding composition which may have a finished thickness B of between about one-half mil (½) mil (0.0005 inch) and about six (6) mils (0.006 inches). In an embodiment, each of the first bonding layers and second bonding layers incudes an extruded bonding composition which may have a finished thickness B of between about one-half mil (½) mil (0.0005 inch) and about four (4) mils (0.004 inches). In an embodiment, each of the first bonding layers and second bonding layers incudes an extruded bonding composition which may have a finished thickness B of between about one (1) mil (0.001 inch) and about six (6) mils (0.006 inches). In an embodiment, each of the first bonding layers and second bonding layers incudes an extruded bonding composition which may have a finished thickness B of between about one (1) mil (0.001 inch) and about four (4) mils (0.004 inches).

Preferably, a single breathable open-cell polyurethane foam layer N is provided. Alternatively, a number X of polyurethane foam layers in a stack S of polyurethane foam layers, in a series of foam layers $N_1$ through $N_X$ can be provided, wherein X is a positive integer greater than one. In a stack S, a first $N_1$ polyurethane foam layer in the number X of polyurethane foam layers is affixed to the first bonding layer, and each subsequent polyurethane foam layer $N_2$, $N_3$ in a series ending at $N_X$, is affixed to the immediately prior foam layer $N_{(X-1)}$. A final polyurethane foam layer $N_X$, or the bottom of a single foam layer N, is affixed to the second bonding layer. In an embodiment, the breathable, open-cell polyurethane foam layer or layers comprises an interior portion having a twenty five percent (25%) indentation force-deflection (IFD) of from about six (6) pounds-force to about thirty (30) pounds-force as measured by ASTM standard D3574. In an embodiment, the breathable, open-cell polyurethane foam layer or layers comprises an interior portion having a twenty five percent (25%) indentation force-deflection (IFD) of from about six (6) pounds-force to about twenty (20) pounds-force as measured by ASTM standard D3574. In various embodiments for a stowable self-inflating bed, an interior portion may be provided which has a twenty five percent (25%) indentation force-deflection of from about ten (10) pounds-force to about nineteen (19) pounds-force as measured by ASTM standard D3574. Further, the single foam layer N, or stack S of polyurethane foam layers $N_X$, has a perimeter. Extending inward from at least a portion of the perimeter, an edge portion is provided, and at least some of the edge portion comprises one (N) or more layers $N_X$ of polyurethane foam layers having a twenty five percent (25%) indentation force-deflection of from about thirty five (35) pounds-force to about fifty (50) pounds-force, as measured by ASTM standard D3574.

BRIEF DESCRIPTION OF THE DRAWING

The present invention(s) will be described by way of exemplary embodiments, using for illustration the accompanying drawing in which like reference numerals denote like elements, and in which:

FIG. 1A is an exploded perspective view for an embodiment of a stowable bed, showing a core assembly with an upper, first air impervious layer and a lower, second air impervious layer, and located therebetween is an open-cell polyethylene foam layer having an interior portion with a first indentation force-deflection specification, and at one edge, an edge portion having a second indentation force-deflection specification. Additionally, a vacuum port valve and a comfort adjustment valve are provided.

FIG. 1B is an exploded perspective view for an embodiment of a stowable bed, similar to the embodiment shown in FIG. 1A, but now showing assembly of a self-inflating chamber using an perimeter air impervious layer, where the perimeter air impervious layer is sealed to the upper, first air impervious layer and to the lower, second air impervious layer.

FIG. 4 shows the construction of an embodiment for a stowable bed by way of a partial cross-sectional view taken vertically, in which the elements of an embodiment for a core assembly and ticking are shown, namely, from the top, a compliant fabric layer, an adhesive layer to bond the compliant fabric to a first air impervious layer, then a first bonding layer adhered to the internal side of the first air impervious layer, then a breathable, open-cell polyurethane foam core, and below, a second bonding layer between the polyurethane foam core and a second air impervious layer, and finally an adhesive layer to bond the second air impervious layer to the compliant fabric layer there below.

FIG. 5 is similar to FIG. 4, although only one-half of the partial cross-section is illustrated (the bottom may be provided as shown for the top), wherein an embodiment for construction of stowable bed is illustrated, in which the elements of an embodiment for a core assembly and ticking are shown, namely, from the top, a compliant fabric layer, but no adhesive layer is present (unlike the structure depicted in FIG. 4), then a first bonding layer adhered to the internal side of the first air impervious layer is provided, then a breathable, open-cell polyurethane foam core.

FIG. 6 is similar to FIGS. 4 and 5, although only one-half of the partial cross-section is illustrated (the bottom may be provided as shown for the top), wherein an embodiment for construction of stowable bed is illustrated, in which the elements of an embodiment for a core assembly and ticking are shown, namely, from the top, a spandex fabric layer (spandex being a lightweight, soft, synthetic stretchable polyurethane based fabric), then an adhesive layer to bond the spandex fabric layer to a first air impervious layer, then a first bonding layer adhered to the internal side of the first air impervious layer is provided to adhere the first air impervious layer to an open-cell polyurethane foam core.

FIG. 7 is similar to FIG. 6, wherein an embodiment for construction of stowable bed is illustrated, in which the elements of an embodiment for a core assembly and ticking are shown, namely, from the top, a spandex fabric layer (but no adhesive layer to bond the spandex fabric layer to the first air impervious layer), then the first air impervious layer, and next a first bonding layer adhered to the internal side of the first air impervious layer to adhere the first air impervious layer to an open-cell polyurethane foam core.

FIG. 8 provides a perspective view of the embodiment for a stowable bed as further described in FIGS. 9 and 10 below, and provides section lines for revealing in FIG. 9 the separate polyurethane foam portions which have different indentation force-deflection specifications.

FIG. 9 provides a perspective view of a cross-section taken along line 9-9 of FIG. 8 for an embodiment of a stowable bed, showing how separate polyurethane foam portions which have different indentation force-deflection specifications may be utilized.

FIG. 10 is a plan view, looking down on a cross-section taken along line 10-10 of FIG. 8, showing how separate polyurethane foam portions which have different indentation force-deflection specifications may be utilized along the length of a stowable bed, and also showing the use of an edge portion with a higher indentation force-deflection specification than the interior polyurethane foam portions.

FIG. 11 provides a perspective view of the embodiment for a stowable bed as further described in FIGS. 12 and 13 below, and provides section lines for revealing in FIG. 12 the uniform polyurethane foam composition which is provided with different indentation force-deflection sections, due to the removal of plugs of foam from selected locations.

FIG. 12 provides a perspective view of a cross-section taken along line 12-12 of FIG. 11 for an embodiment of a stowable bed, showing how a single polyurethane foam portion with uniform composition and structural properties can be made to have different indentation force-deflection specifications at selected locations, by removing vertical plugs from the polyurethane foam.

FIG. 13 is a plan view, looking down on a partial cross-section taken along line 13-13 of FIG. 12, showing how single, uniform polyurethane foam portion can be utilized, but in which indentation force-deflection specifications may be provided by removal of vertical plugs of the polyurethane foam at selected locations.

FIG. 14 provides a perspective view of the embodiment for a stowable bed as further described in FIGS. 15 and 16 below, and provides section lines for revealing in FIG. 15 the uniform polyurethane foam composition which is provided with different indentation force-deflection sections, due to the removal of horizontally oriented plugs of foam from selected locations.

FIG. 15 provides a perspective view of a cross-section taken along line 15-15 of FIG. 14 for an embodiment of a stowable bed, showing how a single polyurethane foam portion with uniform composition and structural properties can be made to have different indentation force-deflection specifications at selected locations, by removing horizontally oriented plugs from the polyurethane foam.

FIG. 16 is a plan view, looking down on a partial cross-section taken along line 15-15 of FIG. 14, showing how single, uniform polyurethane foam portion can be utilized, but in which indentation force-deflection specifications may be provided by removal of horizontally oriented plugs of the polyurethane foam at selected locations.

FIG. 17 provides a plan view of a partial horizontal cross-section of an embodiment for a stowable bed as further described in FIGS. 15 and 16 below, and provides section lines for revealing in FIG. 15 the uniform polyurethane foam composition which is provided.

FIG. 18 provides a plan view of a horizontal cross-section of an embodiment of a stowable bed, taken along line 18-18 of FIG. 1A, showing the use of a single polyurethane foam central portion with uniform composition and structural properties, but with use of a high indentation force-deflection specification for an edge portion, as well as showing a suitable locations for a vacuum port and for a comfort firmness adjustment valve.

FIG. 19 is a vertical cross-sectional view, taken along line 19-19 of FIG. 17, showing how single, uniform polyurethane foam core portion can be utilized in combination with the use of a high indentation force-deflection edge portion.

FIG. 20 provides a perspective view of an embodiment for a stowable bed, where a double bed size is provided, and wherein a uniform polyurethane foam composition is provided for the core portion, and in which two edge portions with high indentation force-deflection specifications are provided.

FIG. 21 is a vertical cross-sectional view, taken along line 21-21 of FIG. 20, showing how single, uniform polyurethane foam core portion can be utilized in combination with the use of two high indentation force-deflection edge portions.

FIGS. 22 and 23 illustrate an embodiment for a stowable bed, similar to the embodiment first shown in FIGS. 8-10 above, but now showing a double bed design in which along the length of the bed, separate, polyurethane foam portions which have different structural properties are utilized, namely different indentation force-deflection specifications, and in which two edge portions with a higher indentation force-deflection specification than the interior portions is utilized.

FIG. 22 provides a perspective view of the embodiment for a stowable bed in a double bed design, as further described in FIGS. 24 and 25 below, and provides section lines for revealing in FIG. 24 the separate polyurethane foam core portions which have different indentation force-deflection specifications.

FIG. 23 provides a perspective view of a cross-section taken along line 24-24 of FIG. 22 for a double bed embodiment of a stowable bed, showing how separate polyurethane foam portions which have different indentation force-deflection specifications may be utilized.

FIG. 24 provides a plan view of a partial horizontal cross-section of an embodiment for a stowable bed, and reveals the use of a uniform polyurethane foam composition for the core in combination with the use of two high indentation force-deflection edge portions, as well as the use of multiple compartments which may be independently adjusted by use of a firmness adjustment valve in each compartment.

FIG. 25 is a plan view, with the looking down on an embodiment for a double bed design, with the upper, first air impervious layer partially removed, to reveal separate polyurethane foam portions which have different indentation force-deflection specifications that may be utilized along the length of a stowable bed, and showing the use of an edge portion with a higher indentation force-deflection specification than the interior polyurethane foam portions, as well as the use of multiple, independently pressure adjustable compartments.

FIGS. 26, 27, and 28 illustrate an embodiment for a double bed design for a stowable bed, in which along the length of the bed, a polyurethane foam with uniform structural properties and composition is provided, but in which along the length of the bed, different locations have different indentation force-deflection specifications, which result is provided by the removal of vertically oriented plugs of foam at selected locations, as illustrated, in an upper bed location and in a lower bed location.

FIG. 26 provides a perspective view of the embodiment for a stowable bed as further described in FIGS. 27 and 28 below, and provides section lines for revealing in FIG. 27 the uniform polyurethane foam composition which is provided with different indentation force-deflection sections, due to the removal of plugs of foam from selected locations.

FIG. 27 provides a perspective view of a cross-section taken along line 27-27 of FIG. 26 for an embodiment of a stowable bed, showing how a single polyurethane foam portion with uniform composition and structural properties can be made to have different indentation force-deflection specifications at selected locations, by removing vertical plugs from the polyurethane foam.

FIG. 28 is a plan view, looking down on an embodiment for a double bed design, with the upper, first air impervious layer partially removed, to reveal the use of a single uniform polyurethane foam portion for the interior core can be utilized, but in which indentation force-deflection specifications may be varied along the length of the bed by removal of vertical plugs of the polyurethane foam at selected locations.

FIG. 29 provides an embodiment for a double bed design for a stowable bed, in which along the length of the bed, a polyurethane foam interior core portion with uniform structural properties and composition is provided, but in which along the length of the bed, different locations have different indentation force-deflection specifications, which result is provided by the removal of horizontally oriented plugs of foam at selected locations, as illustrated, in an upper bed location and in a lower bed location.

FIG. 30 provides a perspective view of a cross-section taken along line 30-30 of FIG. 29 for an embodiment of a stowable bed, showing how a single polyurethane foam portion with uniform composition and structural properties can be made to have different indentation force-deflection specifications at selected locations, by removing horizontal plugs from the polyurethane foam.

FIG. 39 depicts an embodiment for a longitudinally short, half-Queen size width self-inflating chamber for a bed.

FIG. 40 depicts a side elevation view for longitudinally short, half-Queen size width self-inflating chamber for a bed.

FIG. 41 is a perspective view of a longitudinally short, half-Queen size width self-inflating chamber for a bed, wherein edge portions are provided on both sides.

FIG. 42 is a plan view of the use of a pair of mirror image longitudinally short, half-Queen size with self-inflating chambers, to form a Queen size bed, and in which a head section and a foot section are provided using a selected foam which is not within a self-inflating chamber.

Figure 1C:
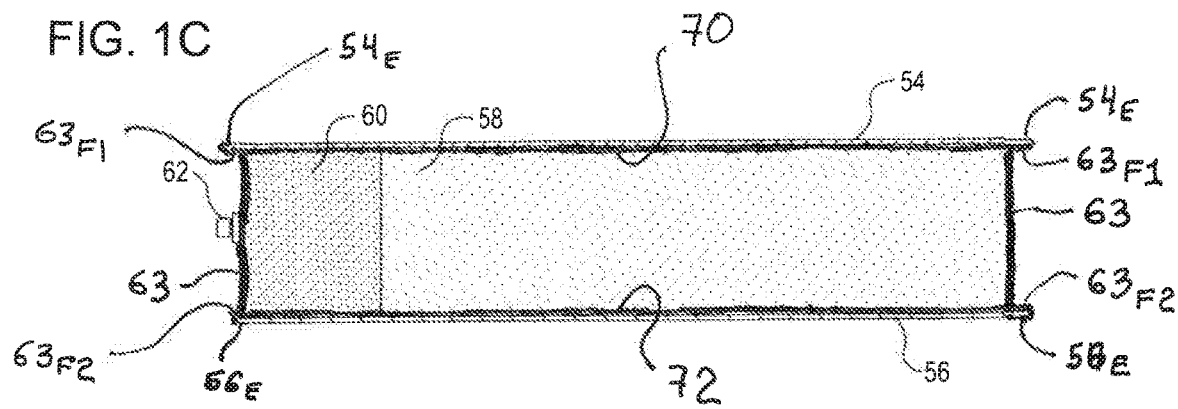
FIG. 1C is a vertical cross-sectional view for an embodiment of a stowable bed, similar to the embodiment just shown in FIG. 1B, but where the perimeter air impervious layer is provided by a suitable sealing film, such as a single layer of polyurethane film, rather than by an air impervious fabric material, and where the sealing film is bonded to the open-cell polyurethane foam layer along the perimeter of the chamber that provides the self-inflating bed.

The foregoing figures, being merely exemplary, contain various elements that may be present or omitted from a final configuration for various embodiments of a self-inflating bed. Other variations in self-inflating beds may use slightly different materials of construction, mechanical structures, mechanical arrangements, air flow configurations, vacuum valve configurations, or firmness valve configurations, and yet employ the principles described herein and as generally depicted in the drawing figures provided. An attempt has been made to draw the figures in a way that illustrates at least those elements that are significant for an understanding of exemplary self-inflating bed designs. Such details may be quite useful for providing a novel self-inflating bed design for various applications.

It should be understood that various features may be utilized in accord with the teachings hereof, as may be useful in different embodiments for a self-inflating bed as useful for various sizes and shapes, depending upon specific design requirements, within the scope and coverage of the teachings herein as defined by the claims.

DETAILED DESCRIPTION

Attention is directed to FIG. 1A, where an exploded perspective drawing is provided for some of the basic elements 48 of an embodiment of a stowable self-inflating bed 50. A self-inflating chamber 52 is provided, and defined between a first air impervious layer 54 and a second air impervious layer 56. In other embodiment, as described below, more than one self-inflating chambers may be provided. In various embodiments, the first air impervious layer 54 and the second air impervious layer 56 may be provided in a material selected from a group comprising (a) woven fabric, (b) non-woven fabric, (c) knitted fabric, and (d) polyvinylchloride sheet material, or (e) flexible polymer or copolymer plastic sheet material. In an embodiment, a polyurethane foam interior portion 58 may be provided, having a twenty five percent (25%) indentation force deflection of from about six (6) pounds force to about thirty (30) pounds force as measured by ASTM Standard D3574. In an embodiment, a polyurethane foam interior portion 58 may be provided, having a twenty five percent (25%) indentation force deflection of from about six (6) pounds force to about twenty (20) pounds force as measured by ASTM Standard D3574. In various embodiments for a stowable self-inflating bed, an interior portion 58 may be provided which has a twenty five percent (25%) indentation force-deflection of from about ten (10) pounds-force to about twenty five (25) pounds-force as measured by ASTM standard D3574. In various embodiments for a stowable self-inflating bed, an interior portion 58 may be provided which has a twenty five percent (25%) indentation force-deflection of from about ten (10) pounds-force to about nineteen (19) pounds-force as measured by ASTM standard D3574. As illustrated, a polyurethane foam edge portion 60, may be provided, having a twenty five percent (25%) indentation force deflection of from about thirty five (35) pounds force to about fifty (50) pounds force as measured by ASTM Standard D3574. Finally, vacuum valve 62, which may be opened and closed, and a firmness adjustment valve 64 which may be opened and closed, are provided.

In various embodiments, the interior portion 58 will be softer than the edge portion 60. Thus, the interior portion 58 will have a lower twenty five percent (25%) indentation force-deflection (IFD) value than the edge portion 60. This follows from the design objective that the interior portion 58 is to provide comfort for sleep, while the edge portion 60 is design to provide sitting support to the user, while preventing the bed from collapsing from the load provided by the user's weight. The user's weight is spread out over a much larger surface area when lying on the interior portion 58, than is the case when setting on the edge portion 60. In an embodiment, it may be advantageous to provide an interior portion 58 and an edge portion 60 where the twenty five percent (25%) indentation force-deflection value of the edge portion 60 divided by the twenty five percent (25%) indentation force-deflection value of the interior portion 58 is greater than one point zero (1.0). In various embodiments, the twenty five percent (25%) indentation force-deflection (IFD) value of the edge portion 60 divided by the twenty five percent (25%) indentation force-deflection (IFD) value of the interior portion 58 (the "IFD Ratio") is in the range of from about one point zero (1.0) to about eight point five (8.5). In various embodiments, the twenty five percent (25%) indentation force-deflection (IFD) value of the edge portion 60 divided by the twenty five percent (25%) indentation force-deflection (IFD) value of the interior portion 58 (the "IFD Ratio") is in the range of from about one point one six (1.16) to about eight point three (8.3). As the width E of the edge portion 60 increases, the just mentioned IFD Ratio may be decreased toward a midrange value, e.g. in the four (4) to five (5) area, more or less. On the other hand, as the width E of the edge portion 60 decreases, the IFD Ratio must increase proportionally, in order to maintain support for a user that sets on the side of the mattress.

Another factor which drives the selection of an IFD Ratio for a particular bed design is the selection of the material and the IFD of the interior portion 58. If the design goal for a particular bed is to provide a "super soft feel" for the bed, then the IFD of the interior portion 58 would be lower, which would drive the IFD Ratio upward, i.e. near the high end of the aforementioned IFD Ratio ranges, which would allow the user to fully immerse into the bed. Conversely, if the design goal for a particular bed design is to provide a firm bed for the user, then the IFD of the interior portion 58 is higher, and thus such a design objective would drive the IFD Ratio toward the low end of the noted above ranges. However, while the variance has been described, for many preferred designs, the IFD Ratio will be in the one point four (1.4) to one two point eight (2.8) range. Observing the suggested IFD Ratio range objectives in view of design objectives for a particular bed design, will enable those of ordinary skill in the art to advantageously utilize the bed design details provided herein.

Figure 3:
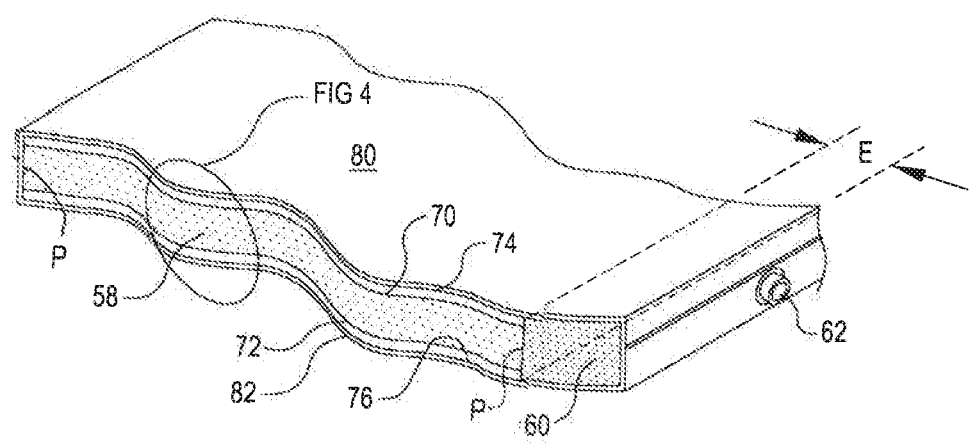
FIG. 3 is a partial perspective view of a cross-section of an embodiment for the core assembly of a stowable bed, taken as if across line 3-3 of FIG. 2, illustrating (not to scale) the components of the core assembly, namely, a first air impervious layer and a second air impervious layer, with a first bonding layer adhered to the internal side of the first air impervious layer, and a second bonding layer adhered to the internal side of said second air impervious layer, and a single breathable open-cell polyurethane foam layer, with the upper side of the polyurethane foam layer adhered to the first bonding layer, and the lower side of the polyurethane foam layer adhered to the second bonding layer. Additionally, construction wherein an interior portion of the polyurethane foam layer and an edge portion of the polyethylene foam layer each have a different indentation force-deflection specification is illustrated.
Figure 3A:
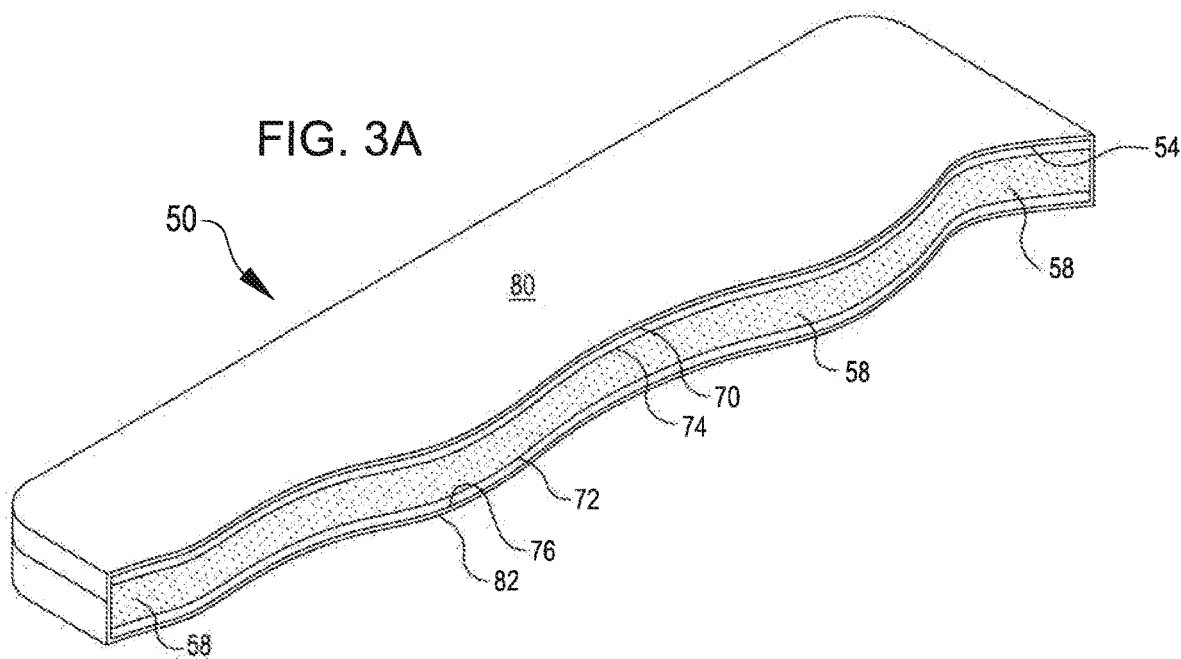
FIG. 3A is similar to FIG. 3, but now shows the construction of an embodiment for a stowable bed, by way of a perspective of a cross-sectional view taken lengthwise as if from top to bottom of the stowable bed, and in which the elements of an embodiment for a core assembly are shown, namely, a first air impervious layer and a second air impervious layer, with the first bonding layer is adhered to the internal side of the first air impervious layer, and a second bonding layer adhered to the internal side of said second air impervious layer, and where a single polyurethane foam layer $N_1$ is shown, with the upper side of the polyurethane foam layer adhered to the first bonding layer, and the lower side of the polyurethane foam layer adhered to the second bonding layer.
Figure 4:
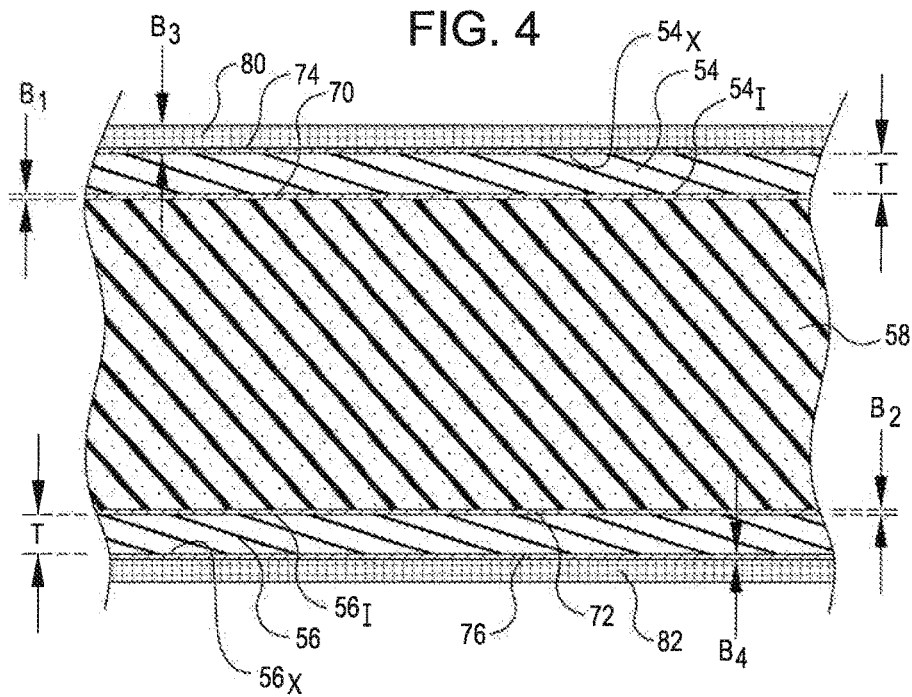
FIGS. 4, 5, 6, and 7 illustrate different embodiments for construction of the ticking.

As easily seen in FIG. 4, and also shown where present in FIGS. 3, 3A, and 4-7, the first air impervious layer 54 and the second air impervious layer 56 each may be provided by a thermoplastic material having an internal side (e.g., 54$_I$, 56$_I$) and an external side (e.g. 54$_X$, 56$_X$), with a thickness T of between about one (1) mil (0.001 inches) and about twelve (12) mils (0.012 inches). In an embodiment, the first air impervious layer and the second air impervious layer may each be provided by an elastic thermoplastic material having an internal side and an external side, and a thickness T of between about two (2) mils (0.002 inches) and about five (5) mils (0.005 inches). A first bonding layer 70 may be adhered to the internal side 54$_I$ of the first air impervious layer 54, and a second bonding layer 72 may be adhered to the internal side 56$_I$ of the second air impervious layer 56. In an embodiment, each of the first bonding layers and second bonding layers incudes an extruded bonding composition which may have a finished thickness B of between about one-half mil (½) mil (0.0005 inch) and about six (6) mils (0.006 inches). In an embodiment, each of the first bonding layers and second bonding layers incudes an extruded bonding composition which may have a finished thickness B of between about one-half mil (½) mil (0.0005 inch) and about four (4) mils (0.004 inches). In an embodiment, each of the first bonding layers and second bonding layers incudes an extruded bonding composition which may have a finished thickness B of between about one (1) mil (0.001 inch) and about six (6) mils (0.006 inches). In an embodiment, each of the first bonding layers and second bonding layers incudes an extruded bonding composition which may have a finished thickness B of between about ne (1) mil (0.001 inch) and about four (4) mils (0.004 inches). In various embodiments, the first bonding layer, or the second bonding layer, or both, may be provided as an extruded bonding composition having a finished thickness $B_1$ and $B_2$, respectively (see FIG. 4) of between about one-half mil (½) mil (0.0005 inch) and about four (4) mils (0.004 inches). In an embodiment, a finished thickness $B_1$ and $B_2$ may be between about one (1) mil (0.001 inch) and about four (4) mils (0.004 inches). In an embodiment, a third bonding layer 74 may be adhered to the external side 54$_X$ of the first air impervious layer 54, and a fourth bonding layer 76 may be adhered to the external side 56$_X$ of the second air impervious layer 56. In various embodiments, the third bonding layer, or the fourth bonding layer, or both, may be provided as an extruded bonding composition having a finished thickness $B_3$ and $B_4$ respectively (see FIG. 4) of between about one-half mil (½) mil (0.0005 inch) and about six (6) mils (0.006 inches). In an embodiment, those extruded bonding compositions may have a finished thickness $B_3$ and $B_4$ respectively, of between about (1) mil (0.001 inch) and about four (4) mils (0.004 inches). Any one or more of the first bonding layer, the second bonding layer, the third bonding layer, and the fourth bonding layer, may be provided as a polyurethane composition. In various embodiments, the polyurethane foam interior portion 58, or a polyurethane foam edge portion 60, or both, may be provided in an open cell polyurethane foam composition.

In FIG. 1B, an exploded perspective view for an embodiment of a stowable bed is shown, similar to the embodiment shown in FIG. 1A, but now additionally including a perimeter air impervious layer 61, which may be provided in the same material as the first air impervious layer 54 and the second air impervious layer 56 as described above. As such, the perimeter air impervious layer may be provided by using a thermoplastic material having a thickness 61T of between about one (1) mil (0.001 inches) and about twelve (12) mils (0.012 inches), or other sizes as noted above for the first 54 and second 56 air impervious layers. In an embodiment, the perimeter air impervious layer 61 may include bonding flanges 61$_{F1}$ and 61$_{F2}$ (see FIG. 1D) which may be sealed to ear portion 54E of the first air impervious layer 54 and to the ear portion 56E of the second air impervious layer 56, respectively. In an embodiment, the bonding flanges $61_{F1}$ and $61_{F2}$ may extend outward for a distance of between about one eight (⅛) of an inch and about five eighths (⅝) of an inches. Likewise the ear portions 54E and 56E may extend outward for a distance of between about one eight (⅛) of an inch and about five eighths (⅝) of an inches. In an embodiment, about three eights (⅜) of an inch may provide an acceptable seam seal using conventional fabrication techniques.

In FIG. 1C, a vertical cross-sectional view for an embodiment of a stowable bed is provided, similar to the embodiment just shown in FIG. 1B, but in this embodiment, a bonding perimeter air impervious layer 63 is provided by a suitable sealing film, such as a polyurethane film, which may be provided in a single layer, rather than by using an air impervious fabric material as provided for the first 54 and second 56 air impervious layers (as shown in FIG. 1B). In an embodiment, the bonding perimeter air impervious layer 63 may be bonded to the open-cell polyurethane foam layer 58, and to the edge portion 60, along a perimeter of the polyurethane foam layer 58. In an embodiment, the same materials and thicknesses for the bonding perimeter air impervious layer 63 may be used as are utilized for first bonding layer 70 and second bonding layer 72. In an embodiment, the first air impervious layer 54 may have laterally extending ear portions 54E, and the bonding perimeter air impervious layer 63 may coat the ear portions 54E to provide a flange seal $63_{F1}$. In an embodiment, the second air impervious layer 56 may have laterally extending ear portions 56E, and the bonding perimeter air impervious layer 63 may coat the ear portions 56E to provide a flange seal $63_{F2}$. Ear portions 54E and 56E may be provided sized as just noted above. The bonding perimeter air impervious layer 63 may be provided in the form of a polyurethane film. In an embodiment, a single polymer layer may provide an acceptable seal. In an embodiment, the bonding perimeter air impervious layer 63 may be provided in a thickness of from about one (1) mil (0.001 inches) to about ten (10) mils (0.010 inches).

Figure 1D:
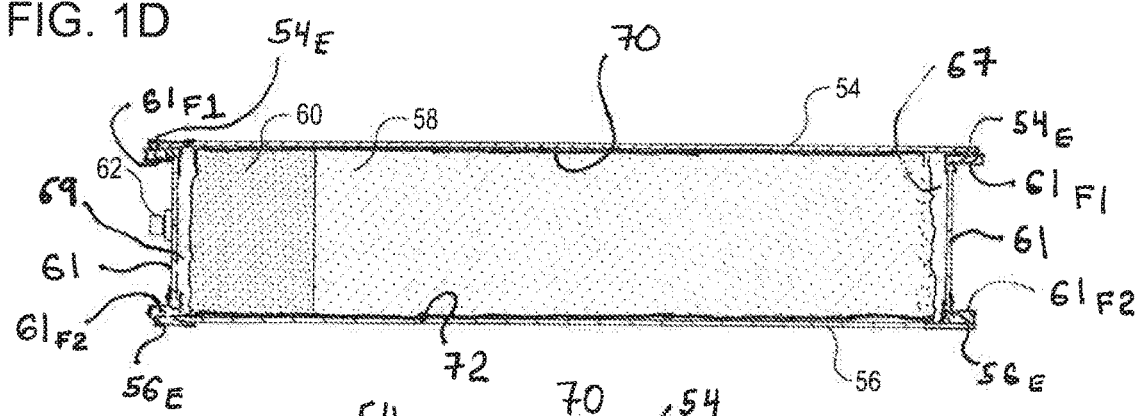
FIG. 1D is a vertical cross-sectional view for an embodiment of a stowable bed, similar to the embodiment just shown in FIG. 1C, but where the perimeter air impervious layer is provided by an air impervious fabric material, and wherein the air impervious fabric material is not bonded to the open-cell polyurethane foam layer, as emphasized by the air gap shown at either end of this cross-section, between the perimeter air impervious layer and the open-cell polyurethane foam layer.

In FIG. 1D, an embodiment for a stowable bed is provided in the configuration illustrated in FIG. 1B and described above. A perimeter air impervious layer 61 is provided by an air impervious fabric material. The air impervious fabric material is not bonded to the open-cell polyurethane foam 58 or edge portion 60; this is shown by exaggerated space 67 in FIG. 1D between foam 58 and perimeter air impervious layer 61, and space 69 between edge portion 60 and perimeter air impervious layer 61. In an embodiment, the first air impervious layer 54 may have laterally extending ear portions 54E, and the perimeter air impervious layer 61 may be sealed to the ear portions 54E to provide a flange seal $61_{F1}$. In an embodiment, the second air impervious layer 56 may have laterally extending ear portions 56E, and the perimeter air impervious layer 61 may coat the ear portions 56E to provide a flange seal $61_{F2}$.

Figure 1E:
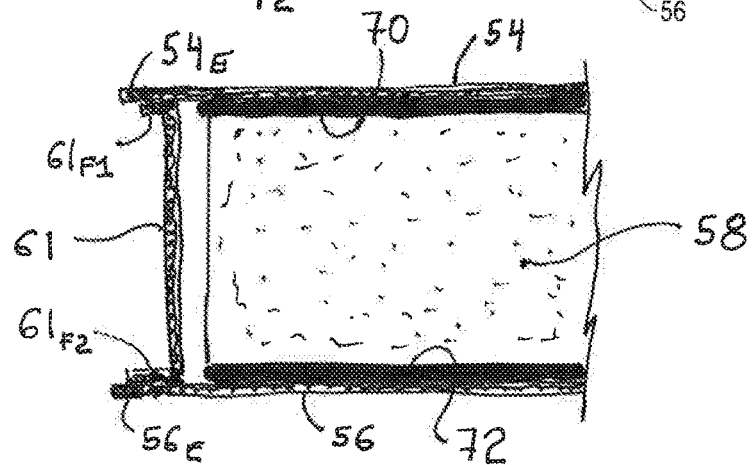
FIG. 1E is a partial vertical cross-sectional view for an embodiment of a stowable bed, similar to the embodiment just shown in FIG. 1D, now providing in a conceptual expanded cross-section an exaggerated (unbonded) gap between the perimeter air impervious layer and the open-cell polyurethane foam in the center.
Figure 2:
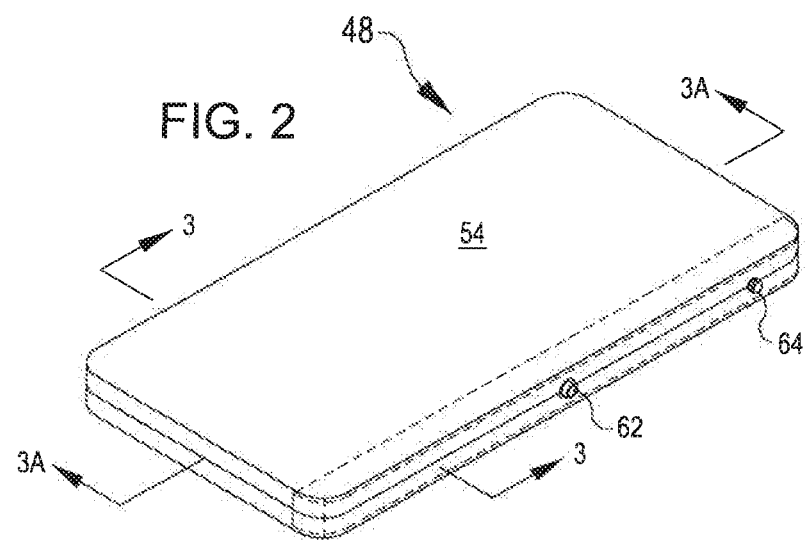
FIG. 2 is a perspective view for an embodiment of a stowable bed, showing the components just illustrated in FIG. 1A above, but now forming a completely fabricated a core assembly with the now hidden breathable open-cell polyethylene foam layer located between an upper, elastic first air impervious layer and a lower, elastic second air impervious layer, and also illustrating a vacuum port valve and a comfort adjustment valve.

FIG. 1E is a partial vertical cross-sectional view for an embodiment of a stowable bed, similar to the embodiment just shown in FIG. 1D, now showing in a conceptual expanded cross-section an exaggerated (unbonded) gap space 67 between the perimeter air impervious layer 61 and the open-cell polyurethane foam 58 in the center. Also shown are bonding layers 70 and 72 which bond the first 54 and second 56 air impervious layers to the interior foam 58.

As seen in FIG. 4, the third bonding layer 74 may be adhered to a first ticking layer 80. The fourth bonding layer 76 may be adhered to a second ticking layer 82. The first ticking layer 80 may be provided as a compliant fabric. Likewise, the second ticking layer 82 may be provided as a compliant fabric.

Figure 6:
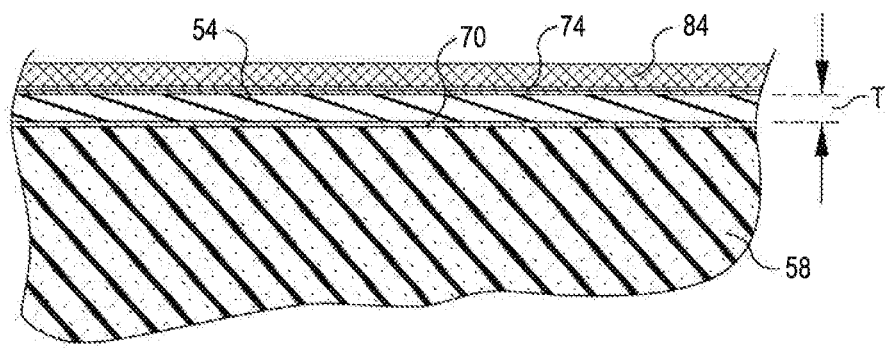

As seen in FIG. 6 the third ticking layer 84, or a fourth ticking layer 86 (not shown, but construction is as illustrated in FIG. 6 for the third ticking layer 84), may be provided as an elastically stretchable fabric. In an embodiment, a spandex type fabric, such as Lycra® brand stretchable fabric, may be utilized as an outer ticking.

Figure 5:
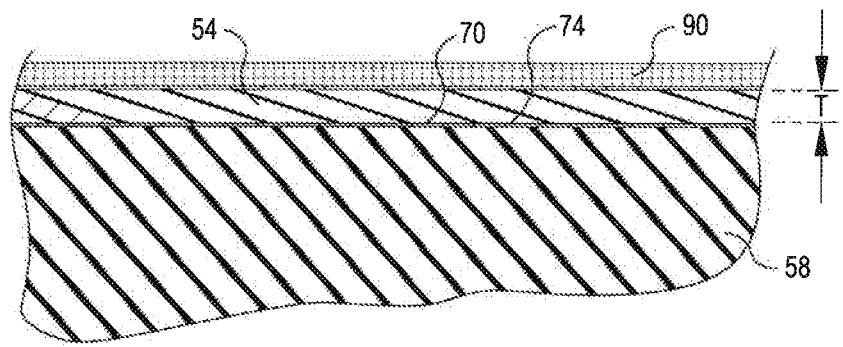

As seen in FIG. 5 a first outer cover 90 or a second outer cover 92 (not shown, but construction is otherwise as illustrated in FIG. 5) may be provided rather than a ticking layer. In such instance, the first outer cover 90 and the second outer cover 92 are not bonded to the adjacent air impervious layer (54 and 56, respectively), but remain unbonded, as a potentially removable or replaceable outer cover. As illustrated in FIG. 5, the first outer cover 90 or the second outer cover 92 may be provided in a compliant fabric layer.

Figure 7:
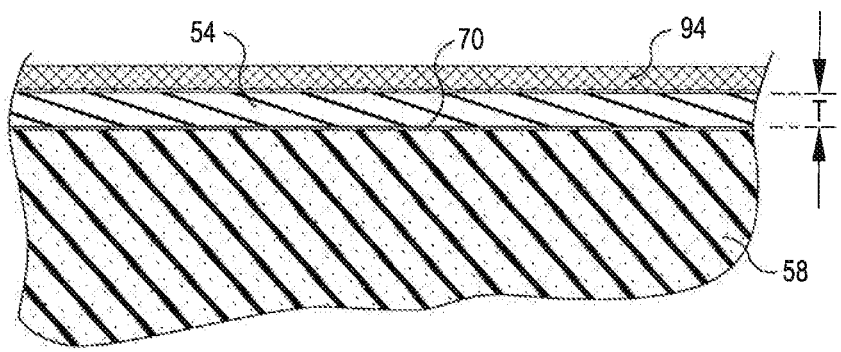

Similarly, as seen in FIG. 7 a third outer cover 94 or a fourth outer cover 96 (not shown, but construction is otherwise as illustrated in FIG. 7) may be provided rather than a ticking layer. In such instance, the third outer cover 94 and the fourth outer cover 96 are not bonded to the adjacent air impervious layer (54 and 56, respectively), but remain unbonded, as a potentially removable or replaceable outer cover. In other words, in such embodiments, there is no third bonding layer 74 on the external side $54_X$ of the first air impervious layer 54, and there is no fourth bonding layer 76 on the external side $56_X$ of the second air impervious layer 56. In any event, as illustrated in FIG. 7, the third outer cover 94 or a comparable fourth outer cover 96 may be provided in an elastically stretchable fabric, such as a spandex type fabric.

In various embodiments, the outer ticking (80, 82, and 84, 86) is provided in materials compliant with fire retardant requirements as set forth under the United States Flammable Fabrics Act, 15 United States Code Sections 1191 through 1204. In various embodiments, the outer ticking (80, 82, and 84, 86) is provided in materials compliant with the cigarette ignition requirements of the U.S. Federal Flammability Standards, as set forth under the 16 Code of Federal Regulations Part 1632. In various embodiments, the outer ticking (80, 82, and 84, 86) is provided in materials compliant with the mattress open flame requirements of the U.S. Federal Flammability Standards, as set forth under the 16 Code of Federal Regulations Part 1633.

In various embodiments, an outer cover (90, 92, and 94, 96) is provided in materials compliant with fire retardant requirements as set forth under the United States Flammable Fabrics Act, 15 United States Code Sections 1191 through 1204. In various embodiments, the outer cover (90, 92, and 94, 96) is provided in materials compliant with the cigarette ignition requirements of the U.S. Federal Flammability Standards, as set forth under the 16 Code of Federal Regulations Part 1632. In various embodiments, the outer ticking (90, 92, and 94, 96) is provided in materials compliant with the mattress open flame requirements of the U.S. Federal Flammability Standards, as set forth under the 16 Code of Federal Regulations Part 1633.

Figure 9:
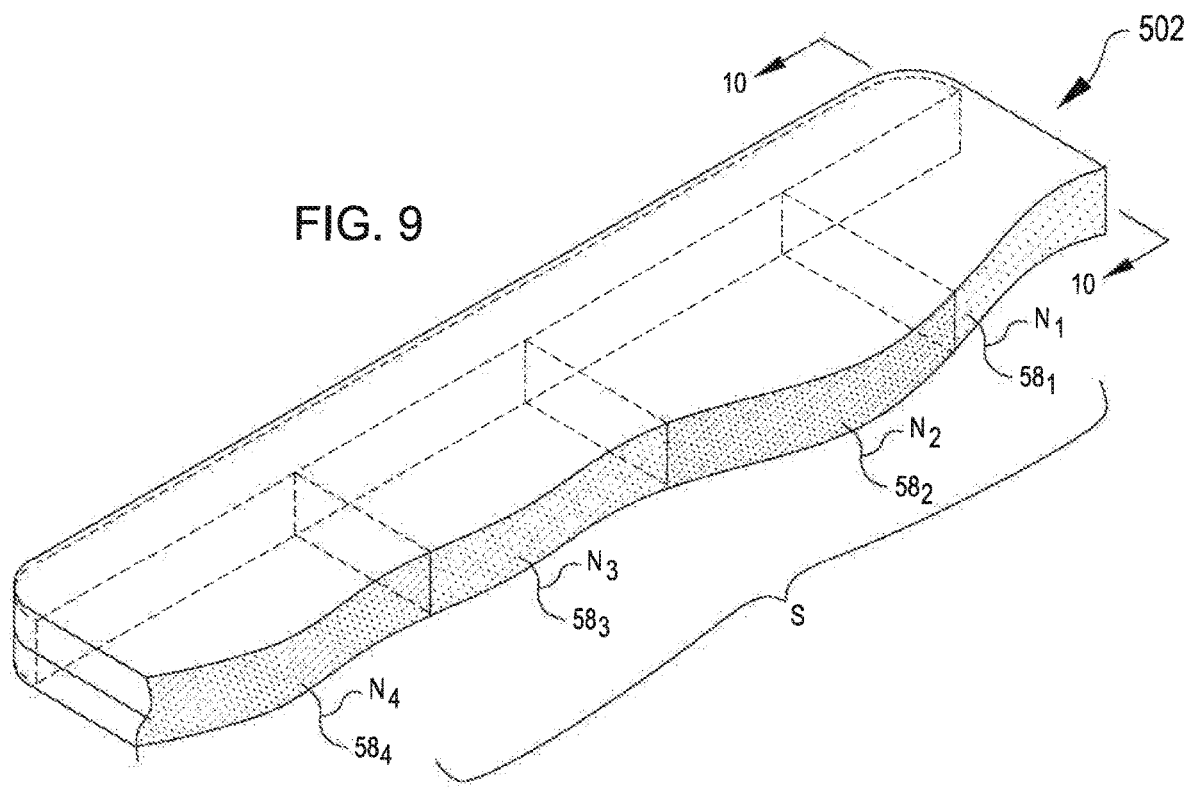
Figure 10:
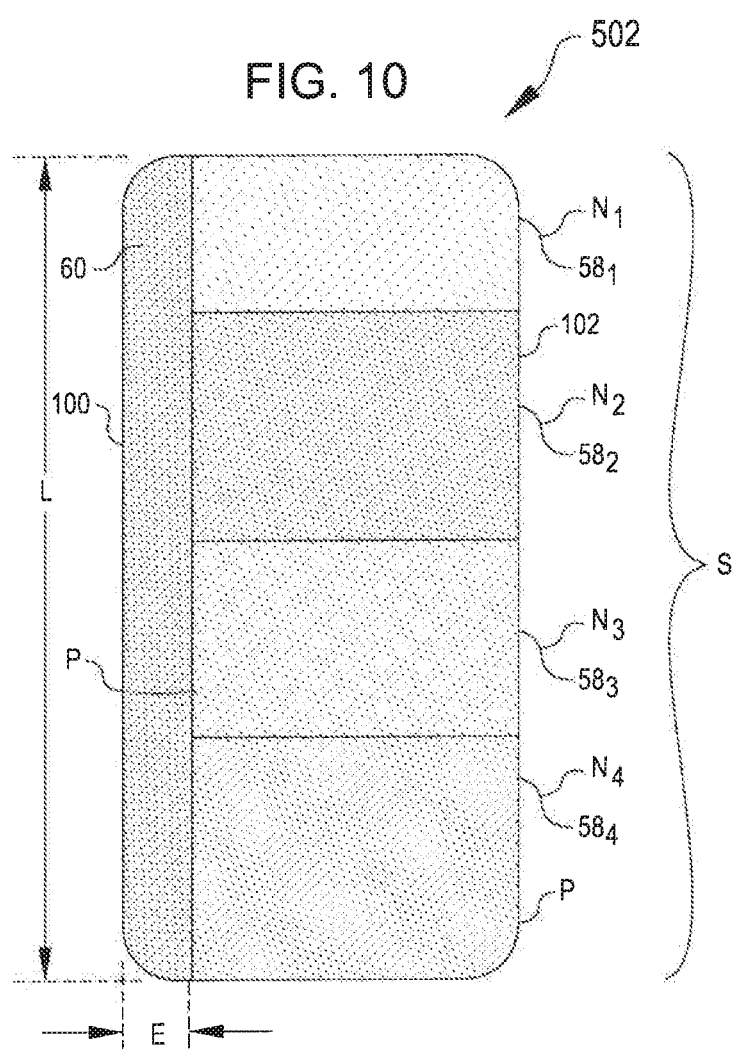

As seen in FIGS. 9 and 10, in various embodiments of a stowable bed 502, a number X of polyurethane foam sections N provide a stack S of polyurethane foam sections in a series of polyurethane foam sections $N_1$ through $N_X$ along the length L of the self-inflating bed, wherein X is a positive integer; as shown in FIGS. 9 and 10, where sections $N_1$ through $N_4$ are provided. In FIG. 10, these polyurethane foam interior portions are also indicated with reference numerals 581, 582, 583, and 584, as applicable for each of the polyurethane foam interior portions. Each of the polyurethane foam sections $N_X$ may be affixed to first bonding layer and to the second bonding layer. One or more sections N of the polyurethane foam sections (four sections $N_1$ through $N_4$ as shown in FIGS. 9 and 10) provides an interior portion or core portion for the stowable bed, and as such may be provided in a polyurethane foam design (whether by compound constituent selection and cure, or by presence of cutouts from the polyurethane foam as elsewhere described herein) having a twenty five percent (25%) indentation force-deflection (IFD) of from about six (6) pounds-force to about twenty (20) pounds-force as measured by ASTM standard D3574. In various embodiments, the interior portion of polyurethane foam may be provided having a twenty five percent (25%) indentation force-deflection (IFD) of from about six (6) pounds-force to about thirty (30) pounds-force as measured by ASTM standard D3574. In various embodiments, the interior portion of polyurethane foam may be provided having a twenty five percent (25%) indentation force-deflection (IFD) of from about ten (10) pounds-force to about twenty five (25) pounds-force as measured by ASTM standard D3574. In various embodiments, the interior portion of polyurethane foam may be provided having a twenty five percent (25%) indentation force-deflection (IFD) of from about ten (10) pounds-force to about nineteen (19) pounds-force as measured by ASTM standard D3574. In such a multi-foam configuration (e.g. as shown in FIG. 10 or 23), one option would be to provide a low IFD foam in section $N_1$, a medium IFD foam in section $N_2$, a low IFD foam in section $N_3$, and a medium or low IFD foam in section $N_4$.

As also seen in FIGS. 3 and 10, the stack S of polyurethane foam sections has a perimeter P, and extending outward from the perimeter P along a first side 100 or along a second side 102, or both, an edge portion 60 is provided. At least some of the edge portion 60 is provided using a polyurethane foam layer having a twenty five percent (25%) indentation force-deflection of from about thirty five (35) pounds-force to about fifty (50) pounds-force, as measured by ASTM standard D3574. In an embodiment, the edge portion 60 may extend inwardly along the first side 100 or along the second side 102 for a distance E of at least three (3) inches. In an embodiment the edge portion 60 may extend inwardly for a distance E in the range of from about three (3) inches to about five (5) inches.

Figure 11:
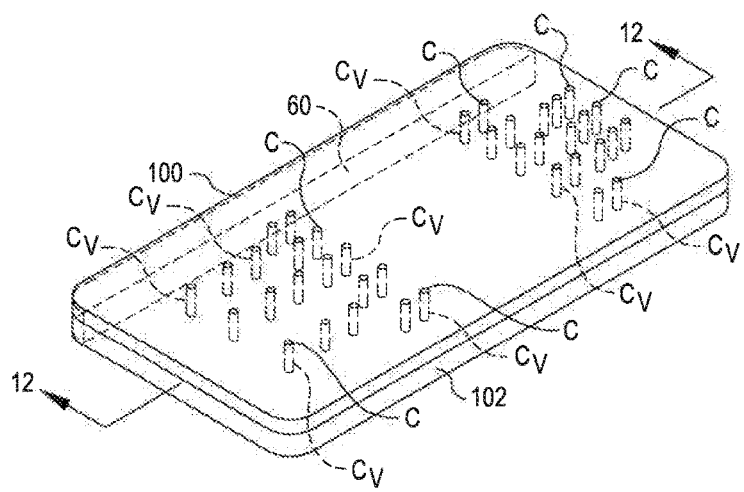
FIGS. 11, 12, and 13 illustrate an embodiment for a stowable bed, in which along the length of the bed, a polyurethane foam with uniform structural properties and composition is provided, but in which along the length of the bed, different locations have different indentation force-deflection specifications, which result is provided by the removal of vertically oriented plugs of foam at selected locations, as illustrated, in an upper bed location and in a lower bed location.
Figure 12:
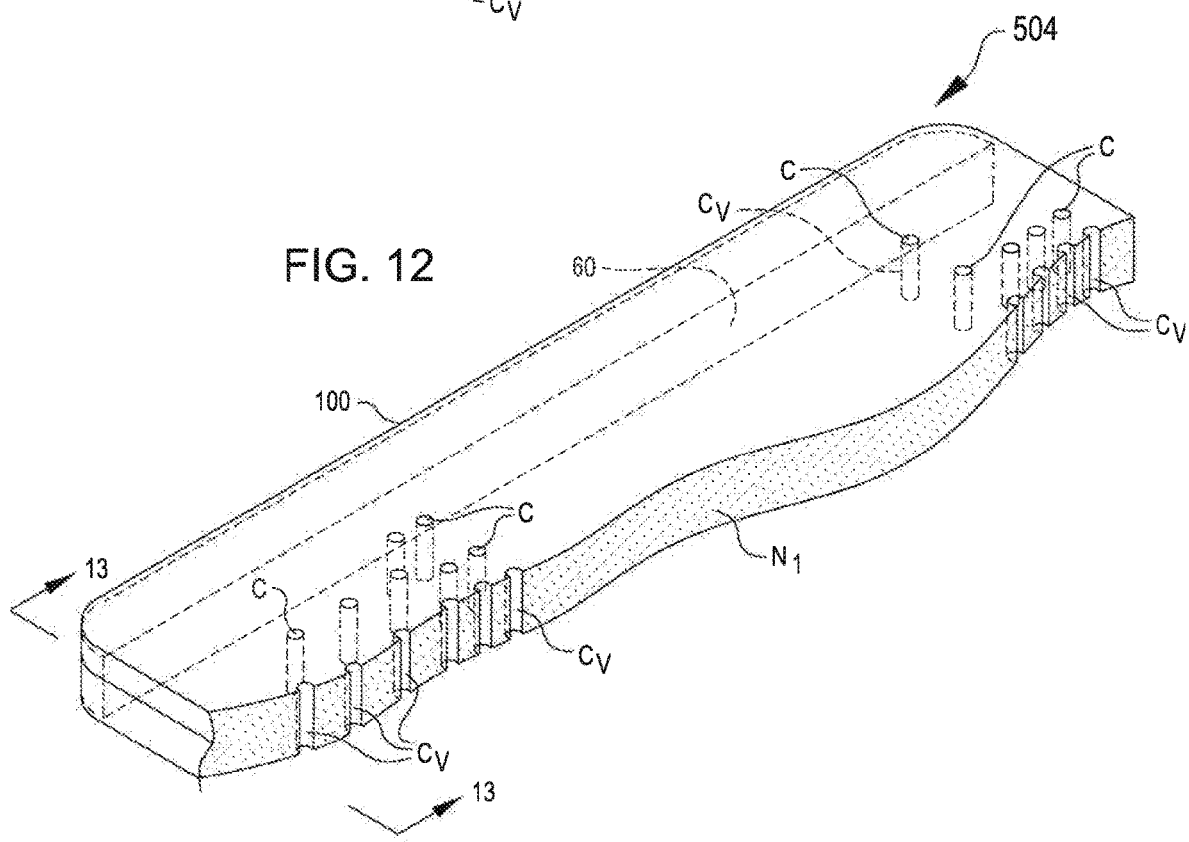
Figure 13:
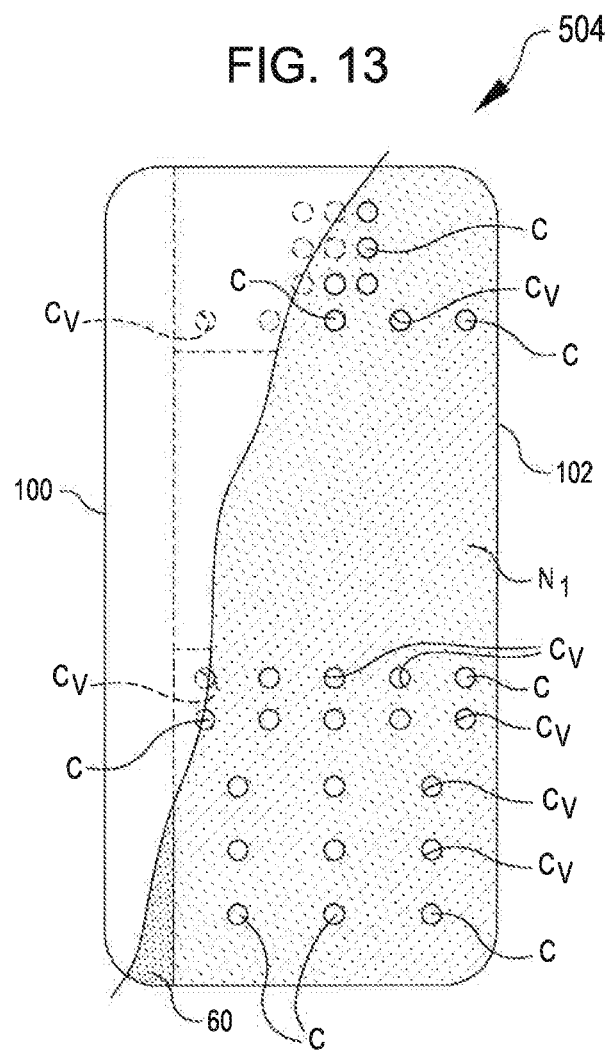

Turning now to FIGS. 11, 12, and 13, an embodiment for the design of stowable bed 504 is depicted in which a single polyurethane foam interior portion (i.e. $N_1$ only) is provided. However, the interior portion is provided in a configuration wherein at least some portions of the single $N_1$ section include a cutout portion C defined by an interior edgewall, and where the cutout portions C are characterized by the absence of polyurethane foam in the cutout portion C. Where, as illustrated in FIGS. 11, 12, and 13, the cutout portions C may extend substantially vertically, the interior edgewalls are indicated by the reference character Cv.

Figure 14:
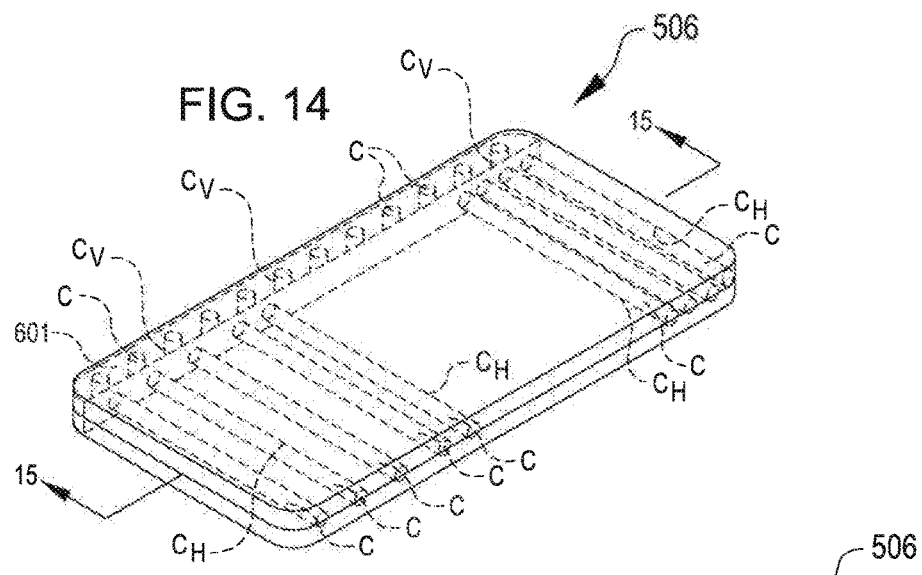
FIGS. 14, 15, and 16 illustrate an embodiment for a stowable bed, in which along the length of the bed, a polyurethane foam with uniform structural properties and composition is provided, but in which along the length of the bed, different locations have different indentation force-deflection specifications, which result is provided by the removal of horizontally oriented plugs of foam at selected locations, as illustrated, in an upper bed location and in a lower bed location.
Figure 15:
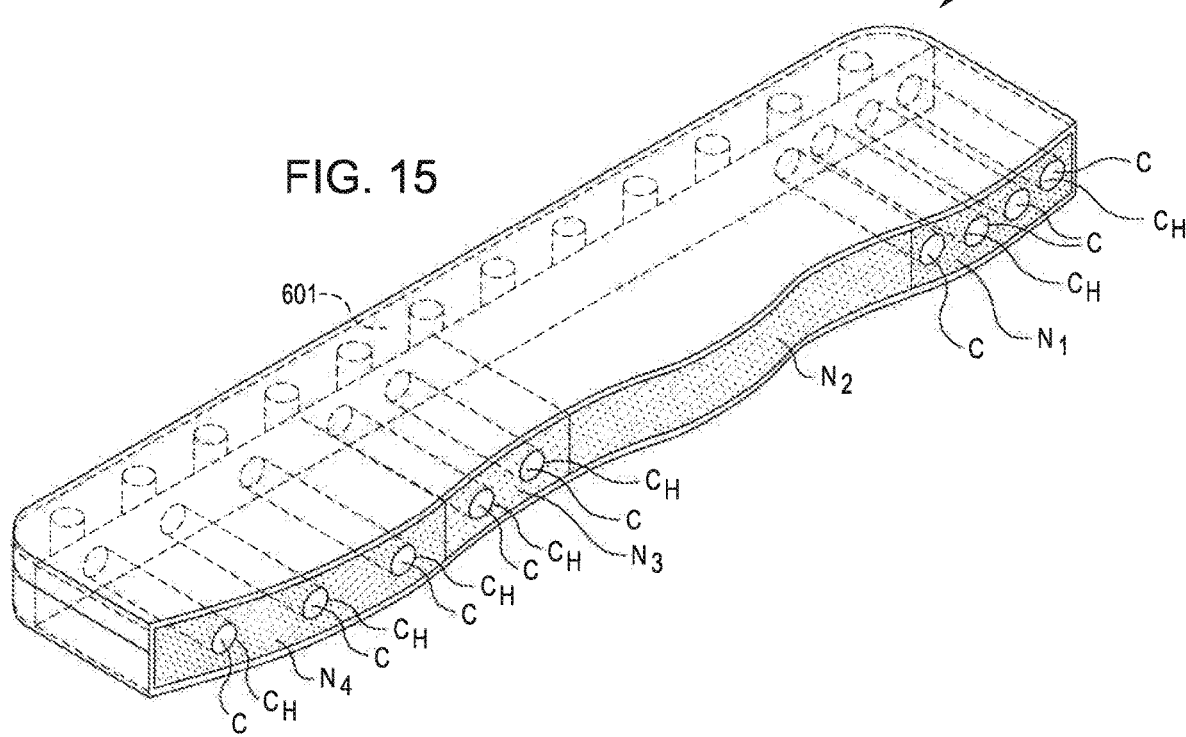
Figure 16:
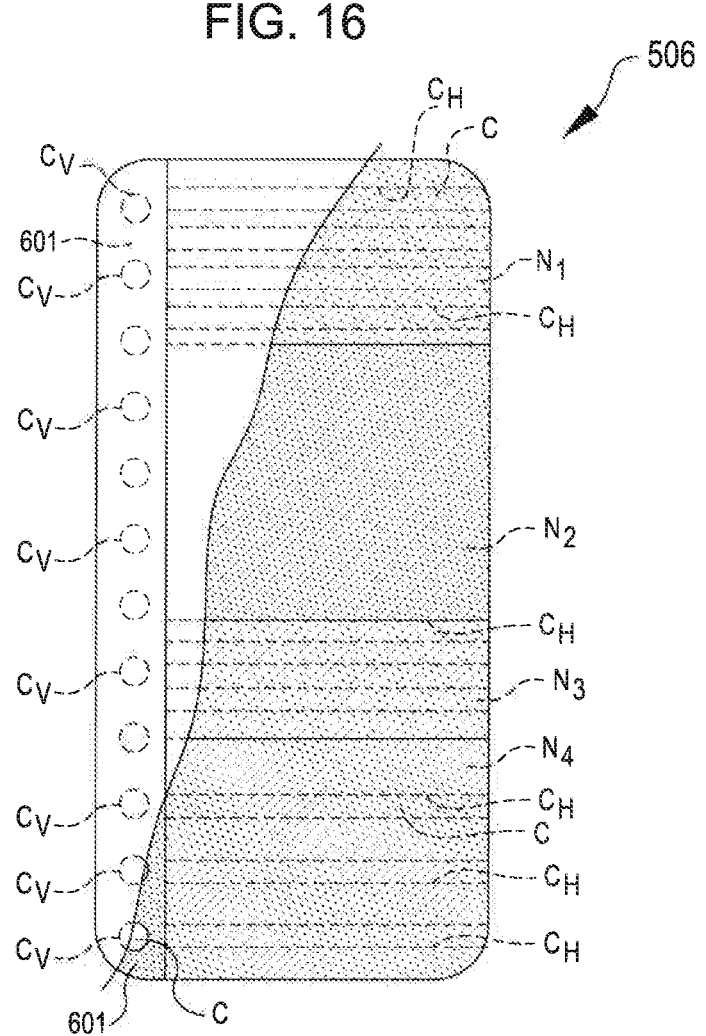

As illustrated in FIGS. 14, 15, and 16, in an embodiment for a stowable bed 506, some (or all—not shown, but for example, similar to FIGS. 11 and 12, with no cutout portions in the edge portion 60) of the cutout portions C may extend substantially horizontally. In such case, the interior edgewalls are indicated therein by use of the reference character $C_H$. Additionally, in some embodiments, as shown in FIGS. 14-16, both substantially vertically extending cutout portions C (defined by interior edgewalls $C_V$) and substantially horizontally extending cutout portions C (defined by interior edgewalls $C_H$) may be provided. Further, as also illustrated in FIGS. 15 and 16, the use of multiple polyurethane foam sections $N_1$ through $N_X$ along the length L of the self-inflating bed may be utilized in combination with cutout portions. In FIGS. 15 and 16, four polyurethane foam sections, namely $N_1$ through $N_4$, are illustrated. Three of the polyurethane foam sections, namely $N_1$, $N_3$, and $N_4$, are shown with cutout portions, while a fourth section, $N_2$, is shown without cutout portions, as is best seen in FIG. 15. As illustrated, some or all of the polyurethane foam sections in a stack S along the length L of stowable bed (e.g., bed 506) may be of different polyurethane foam compositions. Alternately, various polyurethane foam compositions in a stack S along the length L of a stowable bed may all have the same polyurethane foam compositions. And, a modified edge portion 601 having cutout portions C defined by edge wall portions $C_V$ may be provided, where cutout portions C are characterized by the absence of polyurethane foam in the cutout portions C.

Figure 17:
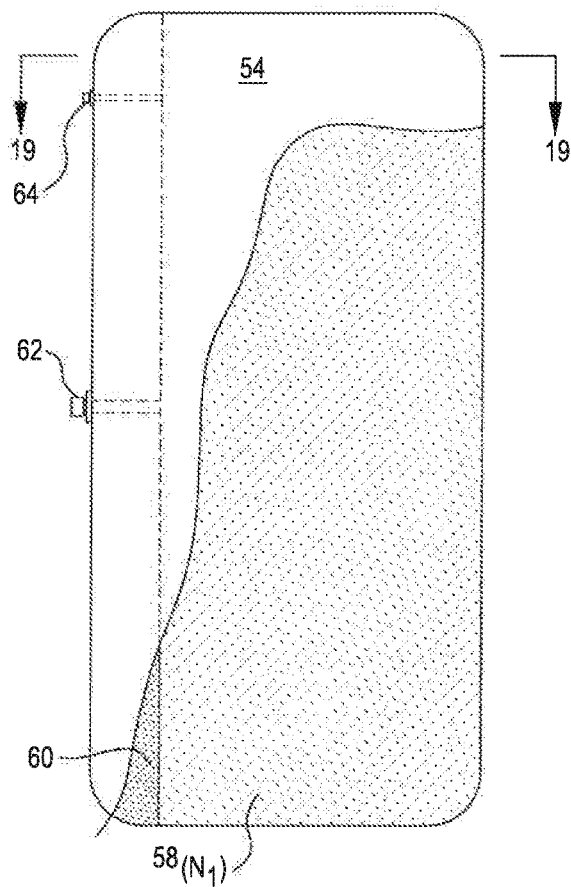
FIGS. 17, 18, and 19 illustrate an embodiment for a stowable bed, in which a vacuum port is provided, and in which a user adjustable comfort vale are provided, and in which a polyurethane foam core of uniform composition and indentation deflection force is provided, and in which an edge portion which has a higher indentation deflection force specification is provided.
Figure 18:
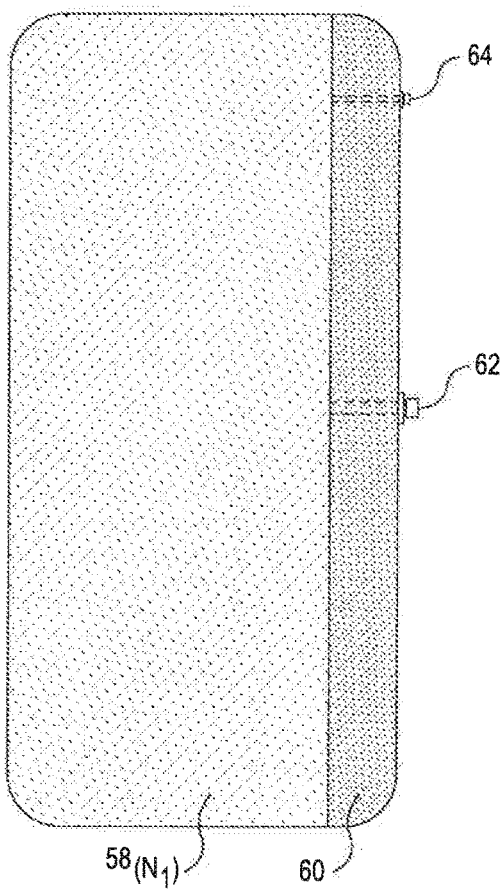
Figure 19:
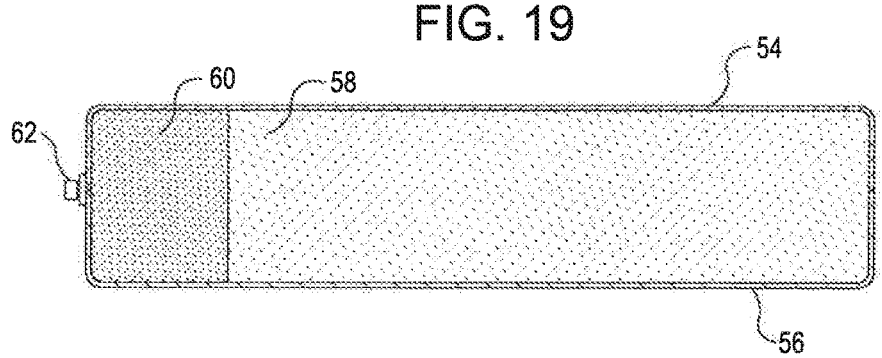

Turning now to FIGS. 17-19, FIG. 18 provides a plan view of a horizontal cross-section of an embodiment of a stowable bed 50, taken looking down along line 18-18 of FIG. 1A, showing the use of a single polyurethane foam interior portion 58 with uniform composition and structural properties, but with use of a high indentation force-deflection specification for an edge portion 60, as well as showing a suitable locations for a vacuum valve 62 and for a comfort firmness adjustment valve 64. FIG. 17 is similar, but taken as if from above, looking down, and with the first air impervious layer 54 partially removed, to reveal the single polyurethane foam interior portion 58.

In FIG. 19, a vertical cross-sectional view is provided, taken along line 19-19 of FIG. 17, showing how single, uniform polyurethane foam core portion 58 can be utilized in combination with the use of a high indentation force-deflection edge portion 60.

Figure 20:
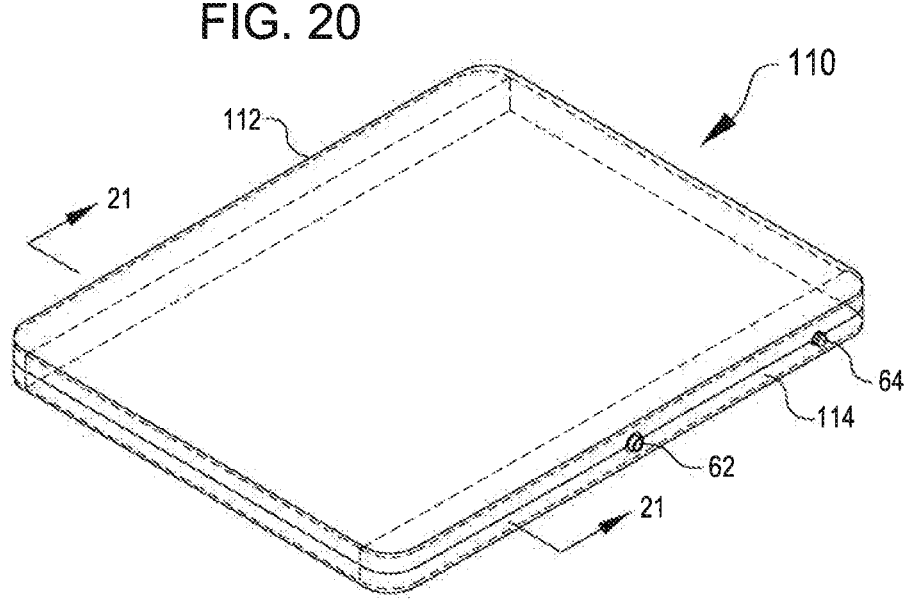
FIGS. 20 and 21 illustrate an embodiment for a stowable bed, where a double bed size is provided, and wherein both sides have an edge portion which has a higher indentation-deflection force specification than the single uniform polyurethane foam core portion.
Figure 21:
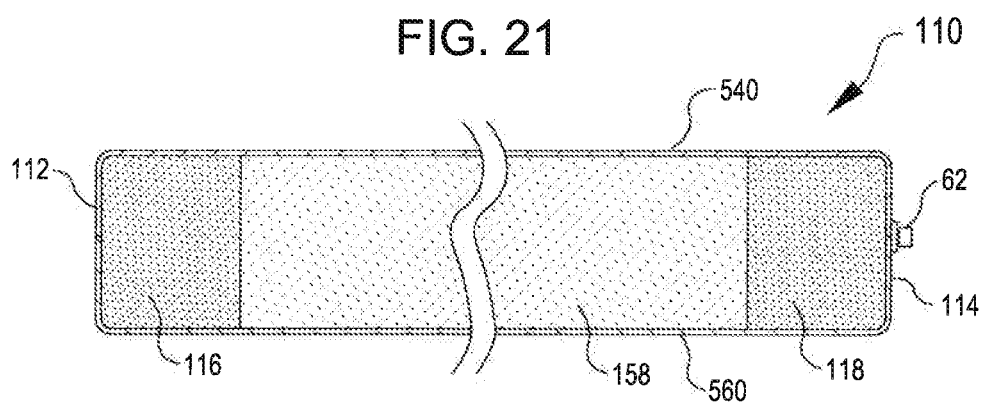

Attention is now directed to FIGS. 20 and 21 which illustrate double bed size embodiments for a stowable bed 110, and wherein both left side 112 and right side 114 have an edge portion (left edge portion 116 and right edge portion 118) which have a higher indentation-deflection force specification than the single uniform polyurethane form core portion 158. A first air impervious layer 540 and a second air impervious layer 560 are provided as described above for the embodiment noted as stowable self-inflating bed 50.

Figure 8:
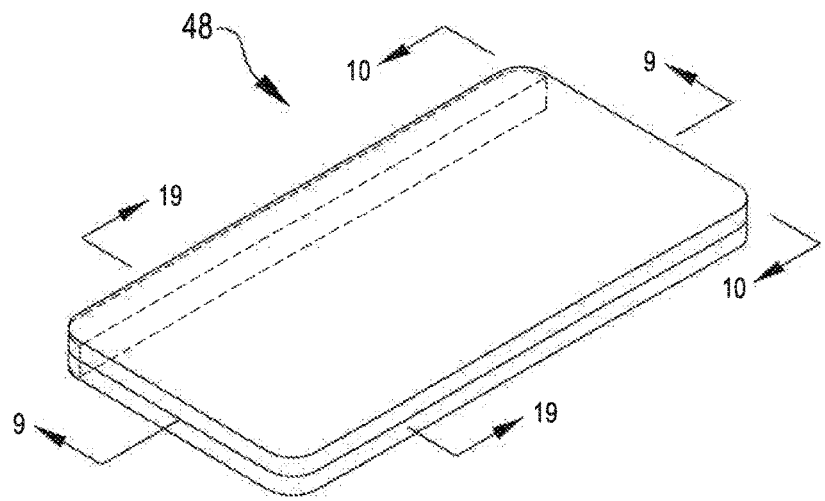
FIGS. 8, 9, and 10 illustrate an embodiment for a stowable bed, in which along the length of the bed, separate, polyurethane foam portions which have different structural properties are utilized, namely different indentation force-deflection specifications, and in which an edge portion with a higher indentation force-deflection specification than the interior portions is illustrated.

FIGS. 22 and 23 illustrate an embodiment for a stowable bed 120, similar to the embodiment first shown in FIGS. 8-10 above, but now showing a double bed design in which along the length L of the bed, separate, polyurethane foam interior portions $N_1$, $N_2$, $N_3$, and $N_4$, which have different structural properties (see shading differences in FIG. 23) are utilized, namely different indentation force-deflection specifications, and in which left edge portion 116 and right edge portion 118 with a higher indentation force-deflection specification than the interior portions is utilized. As shown in FIGS. 22 and 23, a typical width for a double bed configuration might be in the thirty eight (38) inch to fifty eight (58) inch width W range, and with a length L of from about seventy two (72) inches to about eighty (80) inches.

Turning now to FIGS. 24 and 25, plan views are provided of a partial horizontal cross-section of two different embodiments for a stowable bed, namely stowable bed 200 in FIG. 24, and stowable bed 202 in FIG. 25. The design for a stowable double bed 200 in FIG. 24 reveals the use of a uniform polyurethane foam composition for the cores $N_{1A}$ and $N_{1B}$. Alternately (not shown by shading) polyurethane foam composition for the cores $N_{1A}$ and $N_{1B}$ may be different. Additionally, the stowable double bed 200 design is provided in combination with the use of two high indentation force-deflection left edge portion 116 and right edge portion 118. Further, multiple compartments are defined by interior air impervious separator 180, in combination with a first air impervious layer and a second air impervious layer as described above. The use of multiple compartments, here pressure envelope $P_1$ and pressure envelope $P_2$, provides a design in which each pressure envelope (e.g. $P_1$, $P_2$, etc.) may be independently adjusted by use of a firmness adjustment valve 64, either in each pressure envelope $P_1$, $P_2$, etc., as depicted, or alternately between pressure envelopes.

FIG. 25 is a plan view, with the looking down on another embodiment for a stowable double bed design 202, with the upper, first air impervious layer 54 partially removed, to reveal separate polyurethane foam portions ($N_{1A}$ and $N_{1B}$, $N_{2A}$ and $N_{2B}$, $N_{3A}$ and $N_{3B}$, and $N_{4A}$ and $N_{4B}$) which have different indentation force-deflection specifications as may be utilized along the length L of stowable double bed 202. Similar to the configuration noted in relation to FIG. 24 above, the use of multiple compartments defined by interior air impervious separator 182 in the stowable double bed 202 design provides a pressure envelope $P_1$ and pressure envelope $P_2$, wherein each pressure envelope (e.g. $P_1$, $P_2$, etc.) may be independently adjusted by use of a firmness adjustment valve 64, either in each pressure envelope $P_1$, $P_2$, etc., as depicted, or alternately (see valve 64A in broken lines) between pressure envelopes. In an embodiment, a self-inflating bed can be provided that has at least two self-inflating chambers, where a firmness adjustment valve 64 is provided between two of said at least two self-inflating chambers. In an embodiment the firmness adjustment valve 64 can be configured to allowing for one-way flow of air between the self-inflating chambers (e.g. pressure envelopes $P_1$ and $P_2$). In various embodiments, a firmness adjustment valve 64 may be provided in a manually adjustable configuration. Alternately, a firmness adjustment valve 64 may be provided in a self-adjusting configuration.

Figure 26:
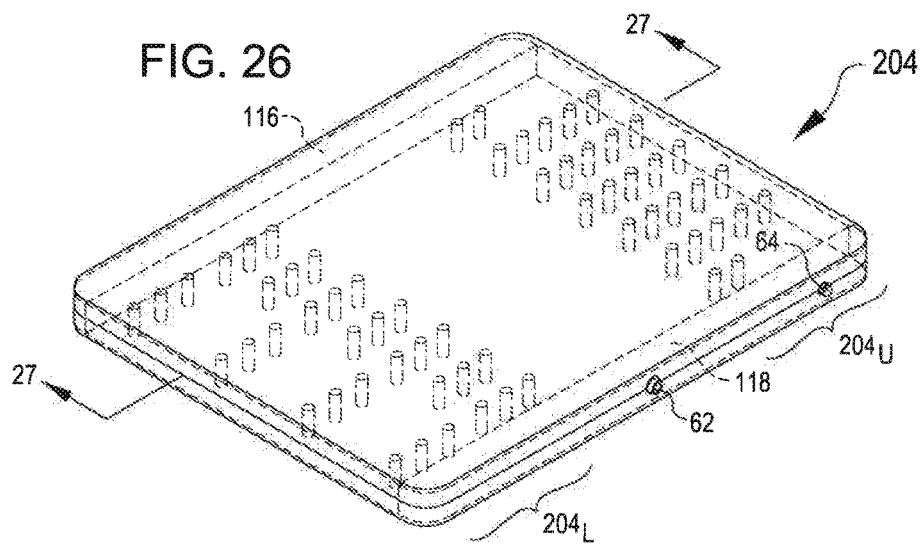
Figure 27:
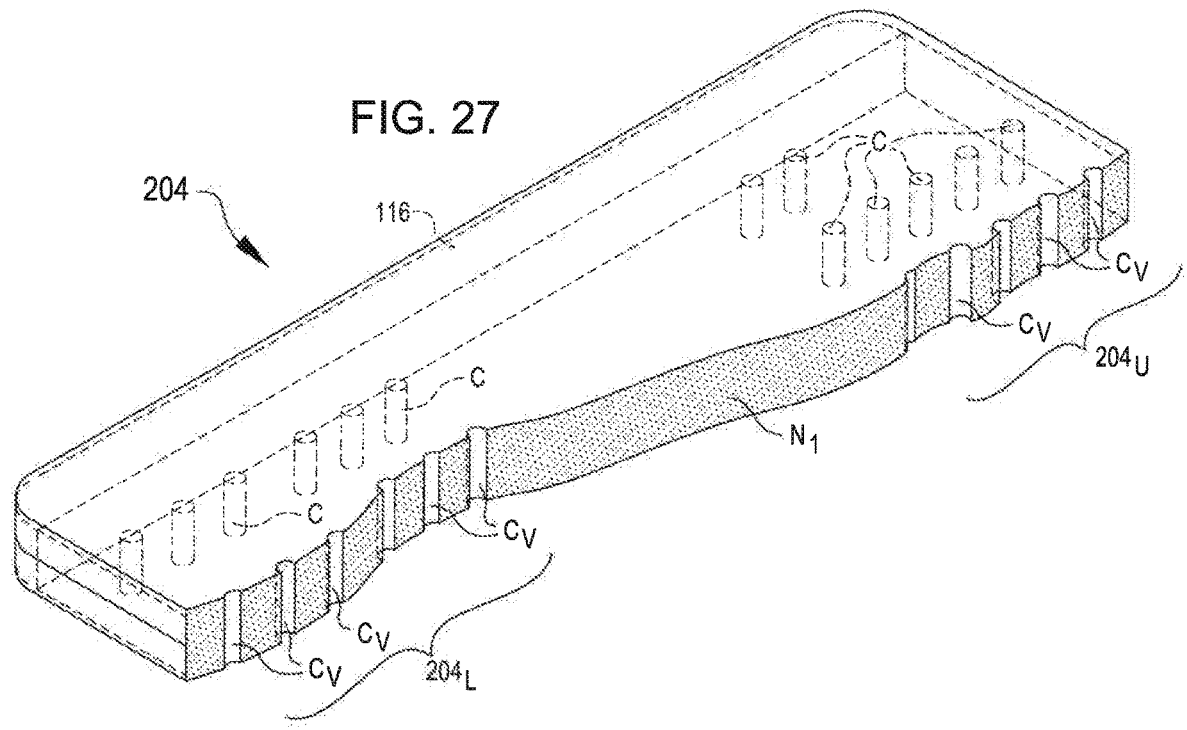

Attention is now directed to FIGS. 26, 27, and 28, which are similar in construction techniques described in relation to FIGS. 11-13 above, but now illustrate an embodiment for a double bed design 204 for a stowable bed. Along the length of the double bed 204, a polyurethane foam with uniform structural properties and composition is provided, but in which along the length of the bed, different locations have different indentation force-deflection specifications. This construction is provided mechanically by the removal of vertically oriented plugs of foam cutouts C at selected locations defined by interior edgewalls $C_V$, as illustrated, in an upper bed location 204U and in a lower bed location 204L.

Alternate construction techniques to achieve variable firmness for a user are illustrated in FIGS. 29 and 30, for stowable double bed 206. In this design, along the length L of the stowable bed 206, a polyurethane foam interior core portion $N_1$ with uniform structural properties and composition is provided, but in an upper location 206u and in a lower location 206L, different indentation force-deflection specification is provided by the removal of horizontally oriented cutout portions C of foam at selected locations, as defined by interior edgewall portions $C_H$, as illustrated. Additionally, a left edge portion 116 is shown provided with vertically oriented cutout portion C, defined by interior edgewall portions $C_V$, also to adjust the indention force-deflection specification for selected lengths of the edge portions, e.g. 116 and 118.

Figure 31:
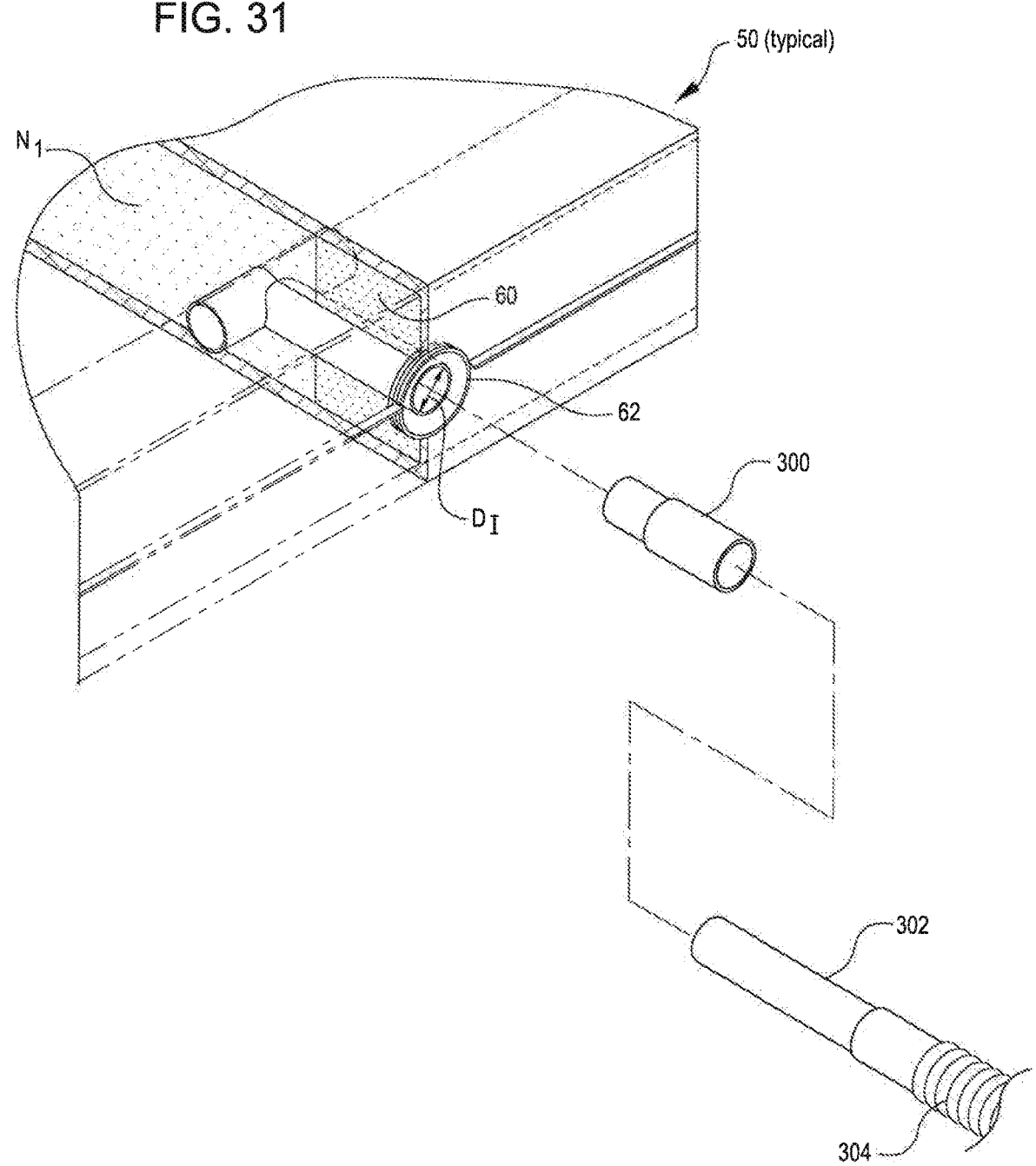
FIG. 31 is a cut-away view showing the use of an adapter for connection to the vacuum port, so that a vacuum source such as a household vacuum or shop vacuum can be utilized to draw a vacuum on an inflated stowable bed, in order to shrink the bed for storage.
Figure 32:
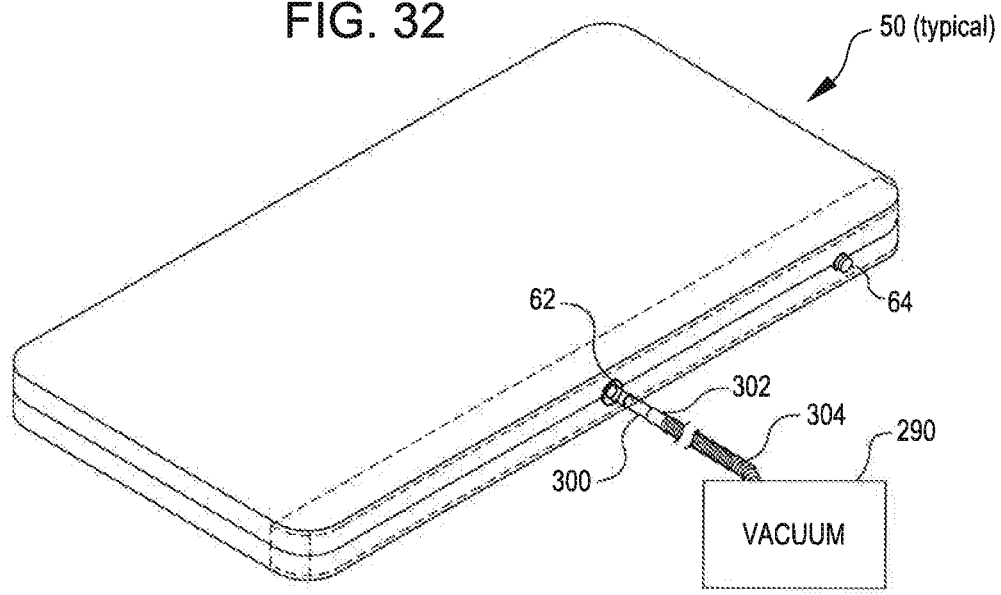
FIG. 32 is a perspective view of the showing the use of a vacuum operably connected to the vacuum port, so that a vacuum source such as a household vacuum or shop vacuum can be utilized to draw a vacuum on an inflated stowable bed, in order to shrink the bed for storage from the inflated size, as shown, to a stowable size, as suggested in FIG. 33 below.
Figure 33:
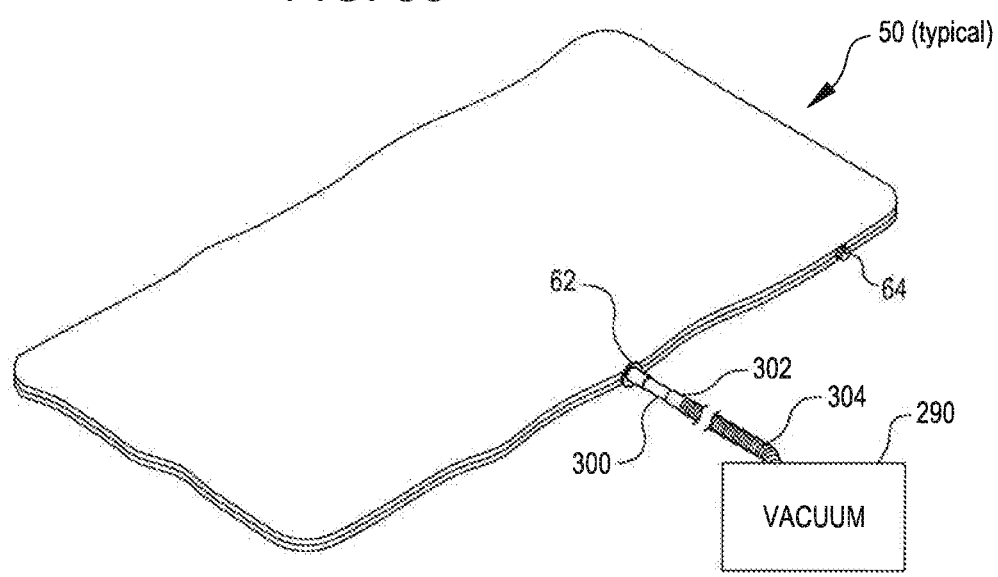
FIG. 33 is a perspective view of the showing the use of a vacuum operably connected to the vacuum port, wherein a vacuum source such as a household vacuum or shop vacuum has been utilized to draw a vacuum on an inflated stowable bed, and has shrunk the bed to a stowable size.
Figure 34:
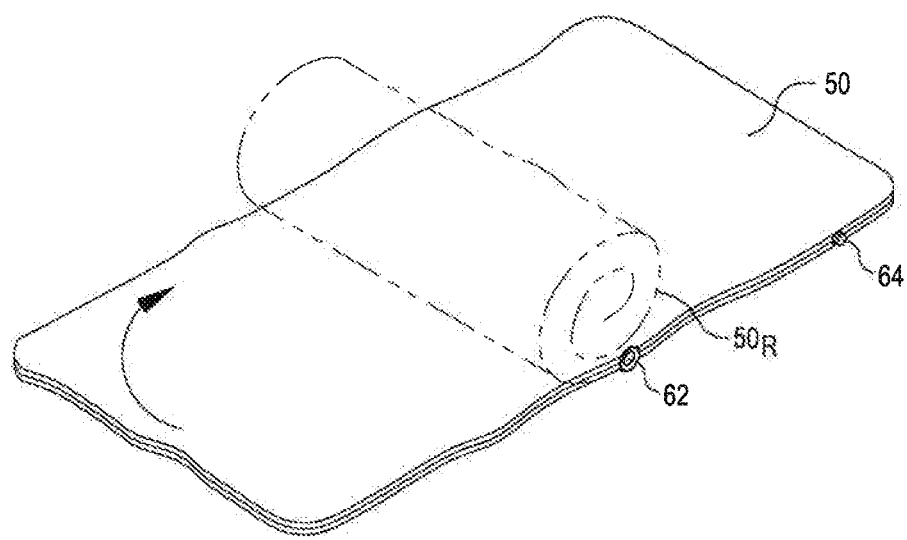
FIG. 34 is a perspective view of the stowable bed, in stowable size, with the vacuum port shut to prevent air from reinflating the bed, and suggesting that the bed may be rolled up for storage.

Attention is directed to FIGS. 31 through 35, in which various items which are helpful in providing a stowable bed are described. FIG. 31 is a cut-away view showing the use of an adapter 300 for connection to the vacuum valve 62, so that a vacuum 290 source such as a household vacuum or shop vacuum (hose end 302 illustrated, as well as flexible hose 304) can be utilized to draw a vacuum on an inflated stowable bed (e.g. bed 50, 200, 202, etc.) in order to shrink the bed (50, typical, similar for 200, 202, etc.) for storage. In an embodiment, the vacuum valve 62 has an inside diameter $D_I$ of about one inch (1"), or more. In an embodiment, the vacuum valve 62 has an inside diameter DI of between about one inch (1") and about two inches (2"). More generally, a self-inflating bed having self-inflating chambers which each have a vacuum valve with a vacuum connection port that is sized and shaped for connection to a household vacuum device, allows the self-inflating bed to be deflated by drawing a vacuum through the vacuum valve.

Figure 35:
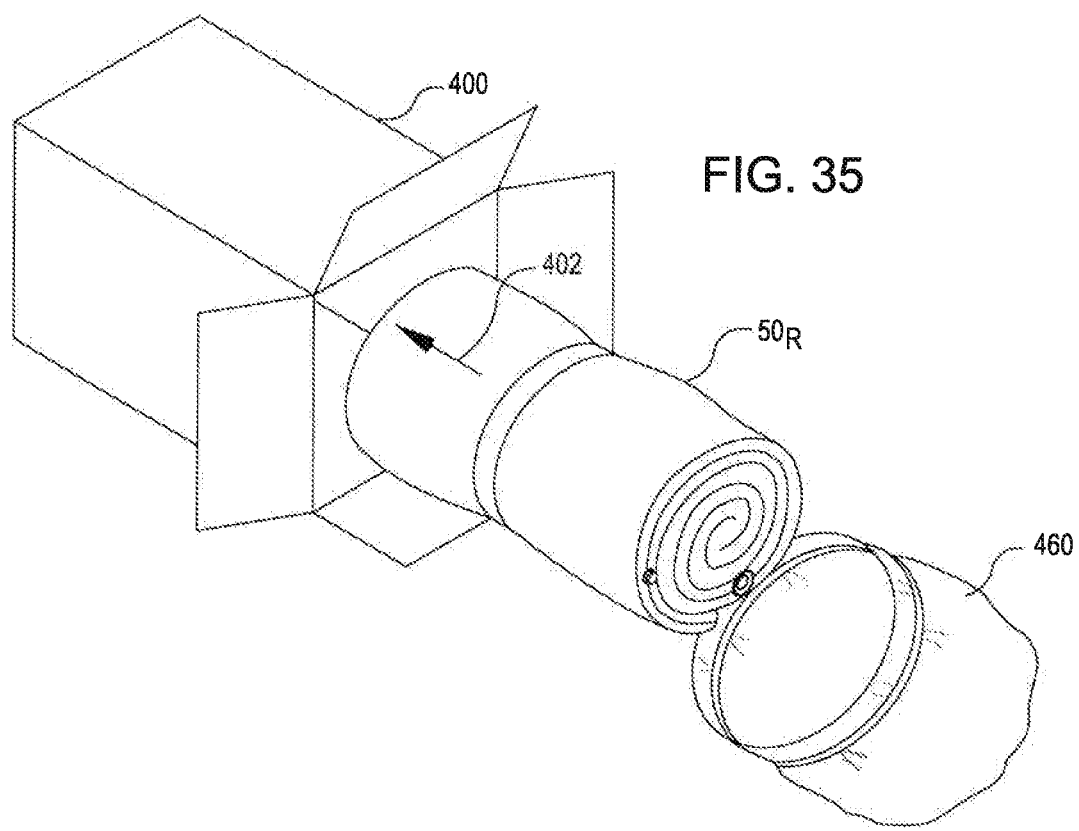
FIG. 35 provides a perspective view of a stowable bed, in a deflated, stowable configuration, and having been rolled up, being inserted into a shipping box.

Once the stowable bed has been reduced in size by way of drawing a vacuum on the pressure chambers ($P_1$, $P_2$, etc.), the vacuum valve 62 is shut to prevent air from entering and reinflating the bed (50, etc.), and the bed may be rolled up for storage. FIG. 35 shows that, in a deflated, stowable configuration 50R a bed (50, etc.) having been rolled up, it may be easily inserted into a shipping box 400 as indicated by reference arrow 402.

Figure 36:
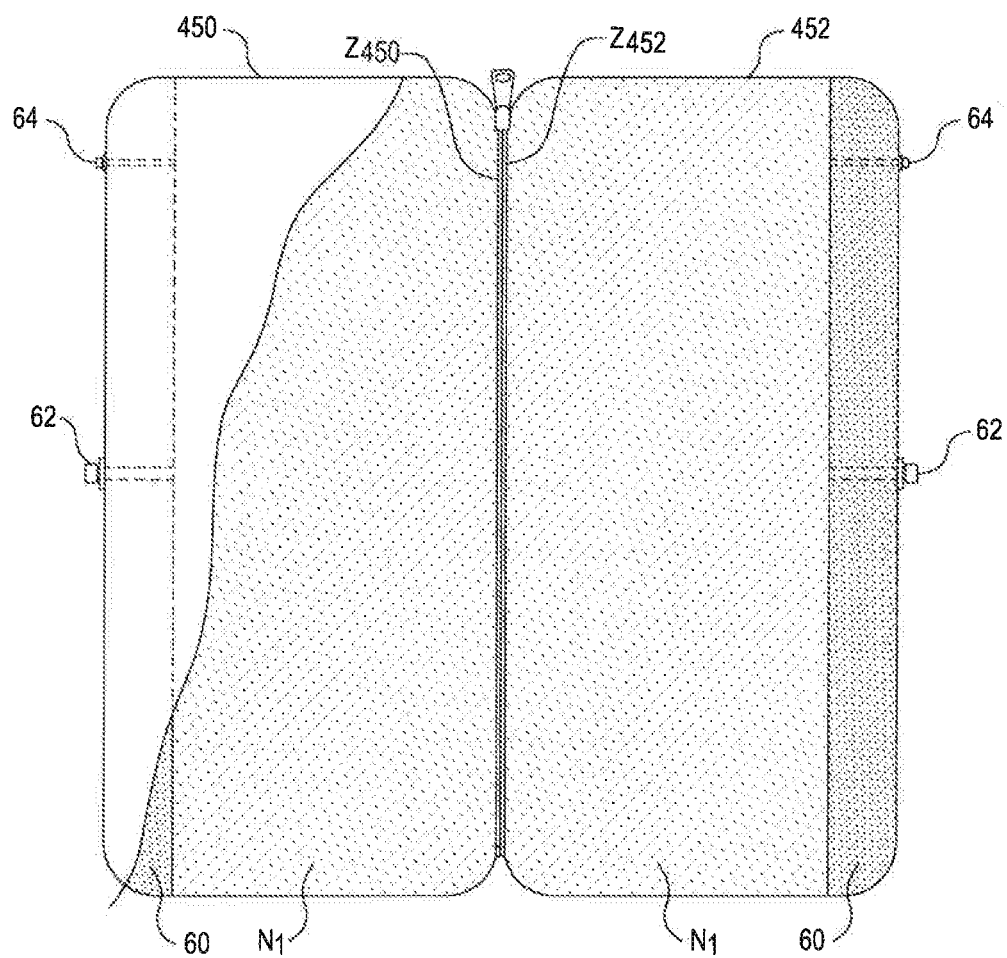
FIG. 36 provides a top plan, partial cut away view that depicts the provision of two single self-inflating beds that are provided in mirror image configurations, wherein the beds may be joined along paralleled zippers, using zipper portions on one bed to join with zipper portions on the mirror image bed.

In an embodiment, as set out in FIG. 36, two single self-inflating beds 450 and 452 can be provided in mirror image configurations. In this manner, the bed 450 and the bed 452 may be joined along parallel zipper portions $Z_{450}$ and $Z_{452}$ (for example, using zipper portions on bed 450 to join with zipper portions on bed 452). With such an embodiment, dual custom storage/shipping bags 460 (as an alternate to box 400, see FIG. 35), that accept a vacuum compressed single bed that is roughly 80 inches in length (i.e., a customary Queen bed size, but the length may range from about 72 inches to about 80 inches) which then allows it to fold in half so that each single bed, 450 and 452, is easily carried or stored in a 40 inch wide bundle. Thus, the user may create such a 40 inch wide bundle that is both easy to carry by an average person, but which also could be shipped via the standard United Parcel Service (UPS) see: https://www.ups.com/us/en/Home page guidelines for length and girth. A second carry bag (not shown) may be provided designed to carry a full outer cover for such beds in a similarly functioning carry condition or shipping condition.

Figure 37:
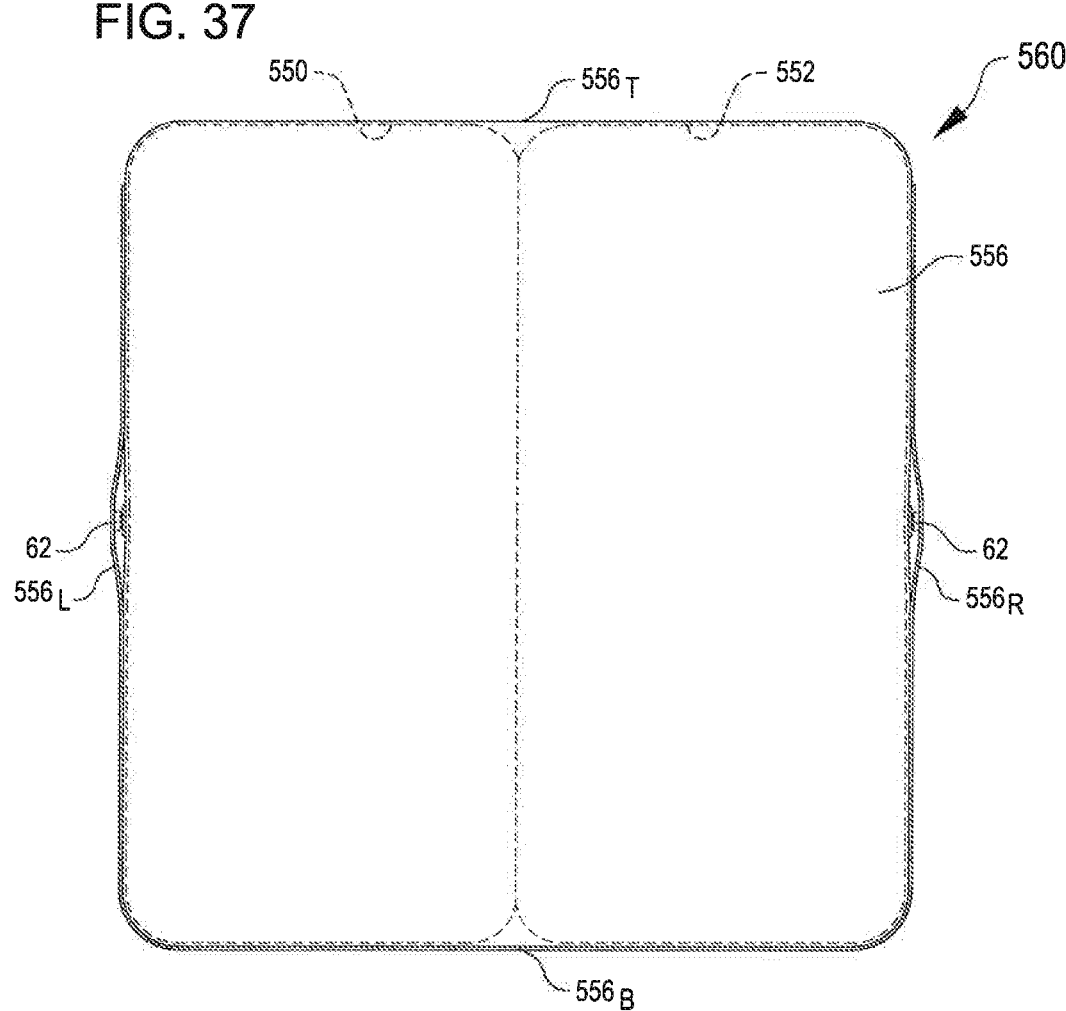
FIG. 37 depicts a top plan view of two single self-inflating beds that are provided in mirror image configurations, wherein the beds may be urged together along an interface line by a cover, such as by use of an upper cover and a base cover joined along paralleled zippers around the perimeter of the double bed configuration, as may be better understood in FIG. 38.
Figure 38:
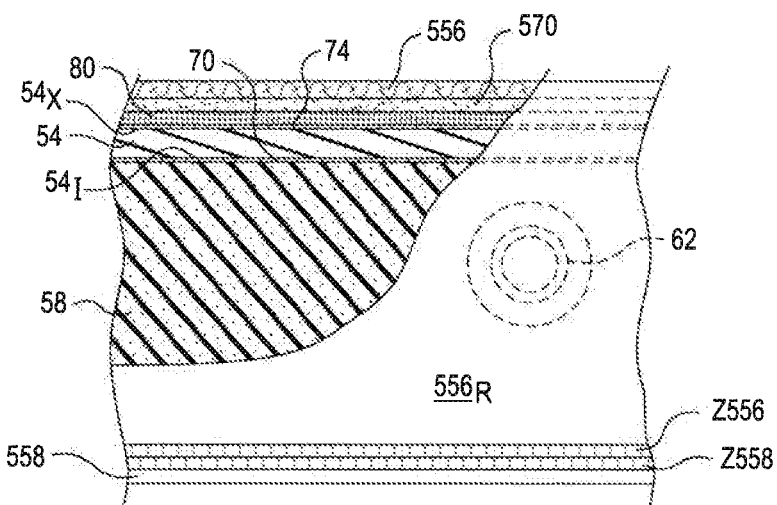
FIG. 38 depicts a partial side view of a single self-inflating as joined with another self-inflating bed a just illustrated in FIG. 37, now showing details of construction as earlier shown in FIG. 4, but additionally showing the use of a fire retardant sock and an outer cover, and also showing how an outer cover and a base cover may be joined by cooperating parallel zipper portions.

In another embodiment, as set out in FIGS. 37 and 38, two single self-inflating beds 550 and 552 can be provided in mirror image configurations. In this manner, the bed 550 and the bed 552 may be retained together along an interface line 554, by being enclosed by an outer cover 556. In an embodiment, the outer cover 556 may include downwardly extending side portions 556R on the right side, 556L on the left side, 556 T at the top, and 556B at the bottom. A base cover 558 may be provided. Cooperating zipper portions Z556 and Z558 allow the outer cover 556 and the base cover 558 to be securely joined with the double bed configuration 560 is in use. Vacuum compression and storage proceeds as just noted above with respect to the embodiment described in FIG. 36.

Additionally, as illustrated in FIG. 38, in an embodiment a fire retardant sock 570 may be provided. Conventionally, as is known to those of skill in the art, a fire retardant sock 570 may be provided in the shape of a lower bed sheet, and in an embodiment with an elastic conforming perimeter or other means to effectively and securely the upper surface and all sides of each of a bed, and as illustrated here, the top and all sides of self-inflating beds 550 and 552.

In another embodiment, as set out in FIGS. 39, 41, and 42, a vertically short, but half-Queen size width self-inflating mattress 650 is shown. In this configuration, a self-inflating chamber 650c of length $L_C$ and width $W_{Q2}$ is provided. In an embodiment, length $L_C$ may be in the range of from about forty eight (48) inches to about sixty (60) inches. In an embodiment, width $W_{Q2}$ may be about thirty (30) inches. Valve port 652 is provided, and vacuum compression and storage proceeds as just noted above with respect to the embodiment described in FIG. 36. Corners may be radiused at a convenient radius $R_{Q2}$. In an embodiment, radius Roz may be about four (4) inches, or slightly less. Self-inflating chamber 650 may have a thickness $T_{Q2}$ in the range of from about four (4) to about five (5) inches. Optionally, a plurality of side-to-side holes 660 defined by interior edgewalls 662 (shown in broken lines) may be provided for adjustment of firmness. In an embodiment, the number of holes 660 may range up to about eight (8). In an embodiment the holes 660 may be about one point three eight (1.38) inches.

As shown in FIG. 38, a vertically short, but half-Queen size width self-inflating mattress 650 may be fabricated with an edge portion 654 on a single side. As shown in FIG. 41, in an embodiment, a second edge portion 674 may be provided, so that edge portions are provided on both sides of a vertically short, half-Queen size width self-inflating mattress 670.

In FIG. 42, the use of a pair of mirror image vertically short, half-Queen size width self-inflating mattresses 650 (same as depicted in FIG. 39, and its mirror image 651, are shown. This design may be utilized where cost reduction is desired, as the design shortens the length LC necessary for the air holding chamber of the self-inflating mattress (650 or 651), so that the air holding chamber length $L_C$, generally in a range of from about forty eight (48) inches to about sixty (60) inches, is configured to just occupy the torso section of the bed 700. Then, the remaining head section 710 and foot section 720 would be filled with selected open cell foams generally compatible with compression of the self-inflating chambers, with shipping and storage as otherwise taught herein.

The above detailed description provides the structural details and other requirements which are appropriate for a stowable bed to perform at an elevated level for the end user/consumer over an expected lifespan (which, in the industry, is now considered to be a minimum of 10 years), as required for beds in homes. Due to the bonding requirements of the open cell polyurethane foam internals, the various polyurethane coatings, films or extrusions must generally be provided in relatively thin gauges, for example, between about 1 mil and about 4 mil, for just the bonding layer as noted above. Additionally, the air-impervious layer may generally be either cross-linked or made of higher melt temperature polyurethane coating or film/extrusion material, again in relatively thin gauges, say between about 2 mil and about 5 mil. Further, additional requirements of the required polyurethanes used in making a product that consumers will embrace include selecting the proper composition that will guard against degradation from humidity. And, careful selection of the elongation properties of the materials used is appropriate, so that the materials selected provide enough elasticity so that the mattress provided by the self-inflating beds described herein will conform to the user's body, thus lowering the pressure applied to the user at the high-pressure points. It is appropriate to note that this factor is also a reason for keeping the thickness (material gauge) used in construction to the lowest limit a practical is a desirable way to improve the elongation performance.

Further, the polyurethane form core portions may need to be provided within precise requirements. In most embodiments, two different grades of polyurethane form compositions may be required to deliver the selected indentation force properties. One of the reasons for the use of multiple grades has to do with the physics of compressing polyurethane foams using a small vacuum device. And, the physics of compression of polyurethane foams by a human body must be understood. As noted above, the IFD (Indentation Force Deflection) is the common measure of how many pounds of force is necessary to provide a specified compression percentage (typically 25% or 50%, in testing). In an exemplary embodiment, it is believed that a maximum limit of about 20 lbs IFD would be preferable. That is because an IFD specification above that will cause most foams to support a body without the air bladder assistance. And, with IFD for the interior core portions of a bed above such a limit, the force required to achieve enough compression for both adjustability and storage are generally found to be too high for normal sized persons or for home vacuum machinery.

Additionally, with the interior core of a bed filled with "soft" foams, an exemplary design needs to address a high load scenario which is encountered every night and morning—which is, we all sit on the edge of our beds. Thus, again, to achieve consumer acceptance one must address the fact that sitting on the edge of a bed having a soft and compliant bladder—while great for comfort—it will compress too easily on the outer edge and cause the user to slide off their bed, which of course is not a good feature. Thus, to overcome that shortcoming of prior art designs, a much higher IFD foam (e.g., in the 35 to 50 pounds force range) should be used along an outer edge portion 60 of the bed. In an embodiment, a suitable width E (see FIG. 10) would be between about three (3) inches and about five (5) inches.

Even with a firmer edge portion 60, the designs provided herein provide a softer foam in the interior portion, for both user comfort and for ease of compression. And, as described above, various embodiments may be provided to further divide up the main soft and compressible foam interior or core portions. Such variations might be adaptable to different users, say, by size, weight, or height, or simply for user comfort, which is a subjective criteria. However, the variations set out herein allow the user or consumer to select a design that may better match a particular individual's comfort sensitivity and support requirements. An option might be to provide interior foams in the IFD range of from about 6 pounds force to about 9 pounds force. Additionally, designs as set out above could also mimic this subtle "body mapping" approach by mechanically removing small pieces of foam in a pattern that reduces the overall IFD for a specific area along the length of a bed.

In various embodiments, the interior foam portions may be provided as monolithic units, in the vertical dimension, i.e. in the user compression direction. In the designs disclosed herein, by using an air-assisted foam core, the foam core acts as a tensile member. This means that when a user is lying on a portion of the pressure chamber provided, the surrounding areas are under tensile pressure, so the air inside is trying to expand outwardly to other areas, but the fully bonded foam core is holding the bed together.

In exemplary embodiments, the valving requirements are quite specific for the self-inflating stowable bed designs described. As mentioned above, the use of a vacuum port sized and shaped so that it that allows mating to commonly available house hold devices is desirable. Maintaining a large diameter opening, say having an inside diameter of at least one inch is desirable for speed of inflation/deflation when stowing or redeploying the bed. The upper size limit for the most commonly found household devices is in the one and one-half inches to about a two inch inside diameter size range for the vacuum connection.

Additionally, a fine pressure adjustment, or firmness valve function, is the key to giving each user the ability to adjust their own mattress firmness. In an embodiment, such a function can be automated by using fine adjustment using check valves with preset pressure settings. In an embodiment, any or all of the vacuum, firmness adjustment, or automatic firmness adjustment could be provided by a single valve design, if desired.

The specific requirements of the outer ticking and outer cover must also be carefully addressed. While at first glance the goal is to make the designs described herein look very much like it is using a traditional mattress ticking, there are some specific requirements that should be followed to achieve the specific performance described above. A key feature is that the user needs to have easy access to the vacuum valve(s) and the firmness adjustment valve(s). The selected valve locations should be easy to locate by the user as needed, yet not be obtrusive or an annoyance while using the bed. Another important requirement for bed design is superior breathability and moisture wicking. In various designs provided herein, the ticking may carry the entire load, so special care must be taken in the selection of materials since the air impervious bladder below the ticking is impervious to both air and to moisture. And, providing elasticity in the top layer of outer ticking, or outer cover, provides best results for desired compliance and comfort. And finally, the ticking must conform to applicable fire-retardant requirements that are mandated in the industry, while avoiding interference with either valve access or top surface compliance.

Finally, in an embodiment, dual custom storage/shipping bags that accept a vacuum compressed single bed that is roughly 80 inches in length (i.e., a customary Queen bed size, but the length may range from about 72 inches to about 80 inches) which then allows it to fold in half so that two paralleled zippers (i.e. zipper portions on each half) create a 40 inch bundle that is both easy to carry by an average person, but which also could be shipped via the standard United Parcel Service guidelines for length and girth. Such features as described in detail herein provide a novel stowable self-inflating bed design that provides a product that can be shipped to the consumer easily and cost effectively, moved to or from one's home easily, or which may be easily returned to dealer for warranty or other reasons. Finally, such an easily packable product as described herein will be desired by large retailers, since the product may easily fit on existing shelving systems, take up minimal space, and promote self-service by customers.

In the foregoing description, for purposes of explanation, numerous details have been set forth in order to provide a thorough understanding of the disclosed exemplary embodiments for the design of a self-inflating stowable bed. However, certain of the described details may not be required in order to provide useful embodiments, or to practice selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in any method described herein may have been described as multiple discrete activities, in turn, in a manner that is most helpful in understanding the present invention. However, the order of description should not be construed as to imply that such activities are necessarily order dependent. In particular, certain operations may not necessarily need to be performed precisely in the order of presentation. And, in different embodiments of the invention, one or more activities may be performed simultaneously, or eliminated in part or in whole while other activities may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

It will be understood by persons skilled in the art that various embodiments for self-inflating bed designs have been described herein only to an extent appropriate for such skilled persons to make and use self-inflating beds. Additional details may be worked out by those of skill in the art for a selected set of specifications, useful life, materials of construction, and other design criteria.

Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures.

Although only certain specific embodiments of the present invention have been shown and described, the invention is not limited to such embodiments. Rather, the invention is to be defined by the appended claims and their equivalents when taken in combination with the description. Numerous modifications and variations are possible in light of the above teachings. Therefore, the protection afforded to this invention should be limited only by the claims set forth herein, and the legal equivalents thereof.

I claim:

1. A self-inflating bed, comprising:
   one or more self-inflating chambers having a length $L_C$, each of said one or more self-inflating chambers defined between a first air impervious layer and a second air impervious layer, said first air impervious layer and said second air impervious layer each comprising a thermoplastic material having an internal side and an external side, and a thickness T of between one (1) mil (0.001 inches) and twelve (12) mils (0.012 inches), wherein each of the one or more self-inflating chambers further comprises a vacuum port valve;
   a first bonding layer adhered to said internal side of said first air impervious layer, and a second bonding layer adhered to said internal side of said second air impervious layer, each of said first bonding layer and said second bonding layer comprising an extruded bonding composition having a finished thickness 8 of between one-half (½) mil (0.0005 inches) and six (6) mils (0.006 inches);
   one or more polyurethane foam sections along the length $L_C$, wherein said one or more polyurethane foam sections are affixed to said first bonding layer and to said second bonding layer, and wherein said one or more polyurethane foam sections comprises an interior portion having a twenty five percent (25%) indentation force-deflection factor, as measured by ASTM standard D3574, and said interior portion further comprising a perimeter;

an edge portion, the edge portion extending outward from said perimeter, wherein at least some of said edge portion comprises a polyurethane foam layer having a twenty five percent (25%) indentation force-deflection factor as measured by ASTM standard D3574, wherein a ratio of the edge portion indention force deflection factor divided by the interior portion force deflection factor is in a range of from one point zero (1.0) to eight point five (8.5); and wherein the edge portion and the one or more polyurethane foam sections are both within at least one of the self-inflating chambers.

2. A self-inflating bed as set forth in claim 1, wherein said first air impervious layer and said second air impervious layer each comprise the thermoplastic material having the internal side and the external side, wherein the thickness T is between two (2) mils (0.002 inches) and five (5) mils (0.005 inches).

3. A self-inflating bed as set forth in claim 1, wherein each of said first bonding layer and said second bonding layer comprising an extruded bonding composition having a finished thickness B of between one (1) mil (0.001 inch) and four (4) mils (0.004 inches).

4. A self-inflating bed as set forth in claim 1, wherein the ratio of the edge portion indention force deflection factor divided by the interior portion force deflection factor is in a range of from one point one six (1.16) to eight point three (8.3).

5. A self-inflating bed as set forth in claim 1, wherein the ratio of the edge portion indention force deflection factor divided by the interior portion force deflection factor is in a range of from one point four (1.4) to two point eight (2.8).

6. A self-inflating bed as set forth in claim 1, wherein the edge portion has a width E of from three (3) inches to five (5) inches.

7. A self-inflating bed as set forth in claim 1, wherein said edge portion extends inwardly from said perimeter for a distance E of at least three (3) inches.

8. A self-inflating bed as set forth in claim 1, wherein said first bonding layer, or said second bonding layer, or both, comprises polyurethane.

9. A self-inflating bed as set forth in claim 1, wherein at least one of the one or more polyurethane foam sections in said interior portion comprises open cell polyurethane foam.

10. A self-inflating bed as set forth in claim 1, further comprising a perimeter air impervious layer located adjacent the perimeter of the one or more polyurethane foam sections, the perimeter air impervious layer sealingly affixed to (a) the first air impervious layer, and (b) to the second air impervious layer, and wherein the perimeter air impervious layer is spaced apart from, and remains unbonded to, the one or more polyurethane foam sections.

11. A self-inflating bed as set forth in claim 10, wherein the perimeter air impervious layer comprises a first flange, and wherein the first flange is sealingly joined with the first air impervious layer.

12. A self-inflating bed as set forth in claim 11, wherein the perimeter air impervious layer comprises a second flange, and wherein the second flange is sealingly joined with the second air impervious layer.

13. A self-inflating bed as set forth in claim 11, wherein the perimeter air impervious layer comprises a second flange, and wherein the second flange is sealingly joined with the second air impervious layer, and wherein the second flange comprises a polyurethane film.

14. A self-inflating bed as set forth in claim 1, wherein at least one of said one or more self-inflating chambers further comprise a vacuum valve having a vacuum connection port, said vacuum connection port sized and shaped for connection to a household vacuum device, so that said self-inflating bed is configured to be deflated by drawing a vacuum through said vacuum valve.

15. A self-inflating bed as set forth in claim 14, wherein said vacuum connection port has an inside diameter of one inch (1"), or more.

16. A self-inflating bed as set forth in claim 14, wherein said vacuum connection port has an inside diameter of between one inch (1") and two inches (2").

17. A self-inflating bed, comprising:

one or more self-inflating chambers having a length $L_C$, each of said one or more self-inflating chambers defined between a first air impervious layer and a second air impervious layer, said first air impervious layer and said second air impervious layer each comprising a thermoplastic material having an internal side and an external side, said first air impervious layer and said second air impervious layer each comprising a material selected from a group comprising (a) woven fabric, (b) non-woven fabric, (c) knitted fabric, and (d) polyvinylchloride sheet material, or (e) flexible polymer or copolymer plastic sheet material;

a first bonding layer adhered to said internal side of said first air impervious layer, and a second bonding layer adhered to said internal side of said second air impervious layer, each of said first bonding layer and said second bonding layer comprising an extruded bonding composition having a finished thickness B of between one-half (½) mil (0.0005 inches) and six (6) mils {0.006 inches), wherein each of the one or more self-inflating chambers further comprises a vacuum port valve;

one or more polyurethane foam sections comprising an interior portion having a perimeter;

an edge portion, the edge portion comprising said one or more polyurethane foam sections located adjacent to at least a portion of the perimeter;

wherein the one or more polyurethane foam sections comprising the interior portion have a twenty five percent (25%) indentation force-deflection factor, as measured by ASTM standard D3574;

wherein the edge portion has a twenty five percent (25%) indentation force-deflection factor as measured by ASTM standard D3574, and wherein a ratio of the edge portion indention force deflection factor divided by the interior portion force deflection factor is in a range of from one point zero (1.0) to eight point five (8.5), and wherein the edge portion and the one or more polyurethane foam sections are both within at least one of the self-inflating chambers.

18. A self-inflating bed as set forth in claim 17, wherein the ratio of the edge portion indention force deflection factor divided by the interior portion force deflection factor is in the range of from one point one six (1.16) to eight point three (8.3).

19. A self-inflating bed as set forth in claim 17, wherein the ratio of the edge portion indention force deflection factor divided by the interior portion force deflection factor is in the range of from one point four (1.4) to two point eight (2.8).

20. A self-inflating bed as set forth in claim 19, further comprising a perimeter air impervious layer located adjacent the perimeter of the one or more polyurethane foam sections, the perimeter air impervious layer sealingly affixed to (a) the first air impervious layer, and (b) to the second air impervious layer, and wherein the perimeter air impervious layer is spaced apart from, and remains unbonded to, the one or more polyurethane foam sections.

* * * * *